United States Patent
Utsugi et al.

(10) Patent No.: US 8,217,990 B2
(45) Date of Patent: Jul. 10, 2012

(54) STEREOSCOPIC PICTURE GENERATING APPARATUS

(75) Inventors: Kei Utsugi, Kawasaki (JP); Michio Oikawa, Sagamihara (JP); Takafumi Koike, Sagamihara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1523 days.

(21) Appl. No.: 11/400,212

(22) Filed: Apr. 10, 2006

(65) Prior Publication Data

US 2006/0232584 A1 Oct. 19, 2006

(30) Foreign Application Priority Data

Apr. 13, 2005 (JP) .................................. 2005-115236

(51) Int. Cl.
- *H04N 13/00* (2006.01)
- *H04N 13/02* (2006.01)
- *H04N 13/04* (2006.01)
- *G06K 9/00* (2006.01)
- *G02B 21/22* (2006.01)
- *G03B 21/60* (2006.01)

(52) U.S. Cl. ............. 348/42; 348/51; 348/59; 382/154; 359/376; 359/458

(58) Field of Classification Search .............. 348/42–60; 345/426; 382/154, 284; 359/376, 458, 462

See application file for complete search history.

(56) References Cited

U.S. PATENT DOCUMENTS

| | | | |
|---|---|---|---|
| 2002/0024592 A1* | 2/2002 | Uomori et al. | 348/42 |
| 2003/0179198 A1* | 9/2003 | Uchiyama | 345/427 |
| 2004/0056824 A1* | 3/2004 | Sudo et al. | 345/7 |
| 2004/0057612 A1 | 3/2004 | Tabata | |

FOREIGN PATENT DOCUMENTS

| | | |
|---|---|---|
| JP | 08-009421 | 1/1996 |
| JP | 09-201472 | 8/1997 |
| JP | 11-184453 | 7/1999 |
| JP | 2004-104742 | 4/2004 |

OTHER PUBLICATIONS

Multiple Muliperspective Rendering for Autostereoscopic Displays; Kei Utsugi et al.

* cited by examiner

*Primary Examiner* — Lin Ye
*Assistant Examiner* — Mekonnen Dagnew
(74) *Attorney, Agent, or Firm* — Antonelli, Terry, Stout & Kraus, LLP.

(57) ABSTRACT

An apparatus for rendering a three-dimensional model from a plurality of eye points to present a three-dimensional picture, wherein the position of a virtual camera for rendering apexes of the three-dimensional model is controlled in accordance with the amount of protrusion of an object under rendering from a display plane to create and present a non-perspective projection picture as a picture at each eye point position. Also, for this control, a weighting parameter is incorporated in each part of the three dimensional model, such that the presentation of stereoscopic sense can be finely controlled.

8 Claims, 21 Drawing Sheets

FIG.1
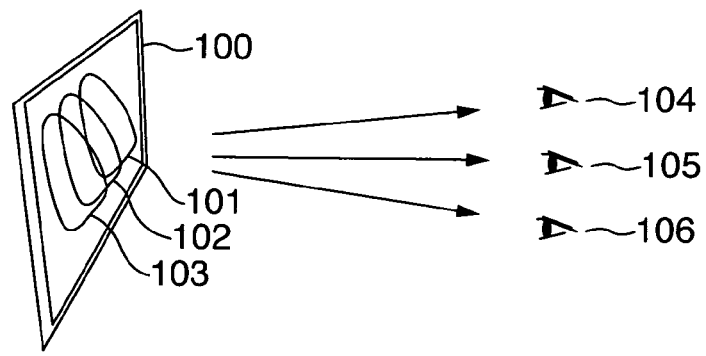
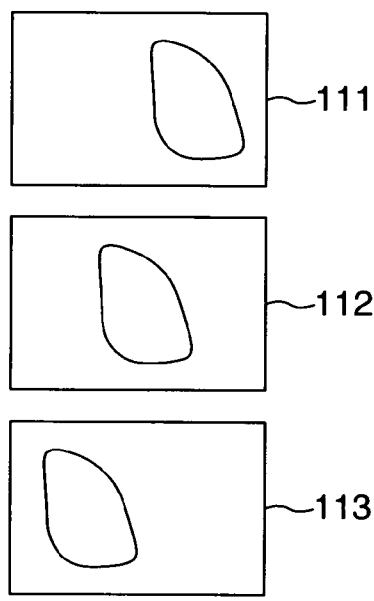
FIG.2
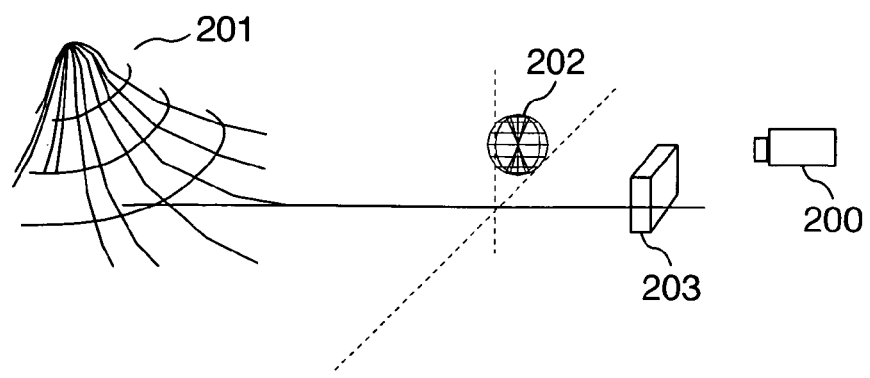

FIG.9

| | |
|---|---|
| REFERENCE DATA TO MODEL i | ~901 |
| REFERENCE POINTER TO PARENT NODE | ~902 |
| REFERENCE POINTER 1 TO CHILD NODE<br>REFERENCE POINTER 2 TO CHILD NODE<br>. . . | ~903 |
| ROTATION MATRIX (LOCAL) $R\_i$<br>$R\_{11}\ R\_{12}\ R\_{13}$<br>$R\_{21}\ R\_{12}\ R\_{12}$<br>$R\_{12}\ R\_{12}\ R\_{33}$ | ~904 |
| MOTION VECTOR (LOCAL) $t\_i$<br>$t\_1\ t\_2\ t\_3$ | ~905 |
| ROTATION MATRIX (GLOBAL) $Rs\_i$ | ~906 |
| MOTION VECTOR (GLOBAL) $ts\_i$ | ~907 |
| EYE POINT CONTROL INFORMATION<br>$w\_i,\ k\_i,\ w\_0\_i,\ d\_i$ | ~908 |

FIG.15

| REFERENCE DATA TO MODEL i | ~1501 |
| REFERENCE POINTER TO PARENT NODE | ~1502 |
| REFERENCE POINTER 1 TO CHILD NODE<br>REFERENCE POINTER 2 TO CHILD NODE<br>. . . | ~1503 |
| ROTATION MATRIX (LOCAL) R_i<br>$R\_11\ R\_12\ R\_13$<br>$R\_21\ R\_12\ R\_12$<br>$R\_12\ R\_12\ R\_33$ | ~1504 |
| MOTION VECTOR (LOCAL) t_i<br>t_1, t_2, t_3 | ~1505 |
| ROTATION MATRIX (GLOBAL) Rs_i | ~1506 |
| MOTION VECTOR (GLOBAL) ts_i | ~1507 |
| PROJECTION MATRIX P_0i<br>EYE POINT POSITION VECTOR p_0i | ~1508 |
| . . . | |
| PROJECTION MATRIX P_(eMax)i<br>EYE POINT POSITION VECTOR p(eMax)i | |

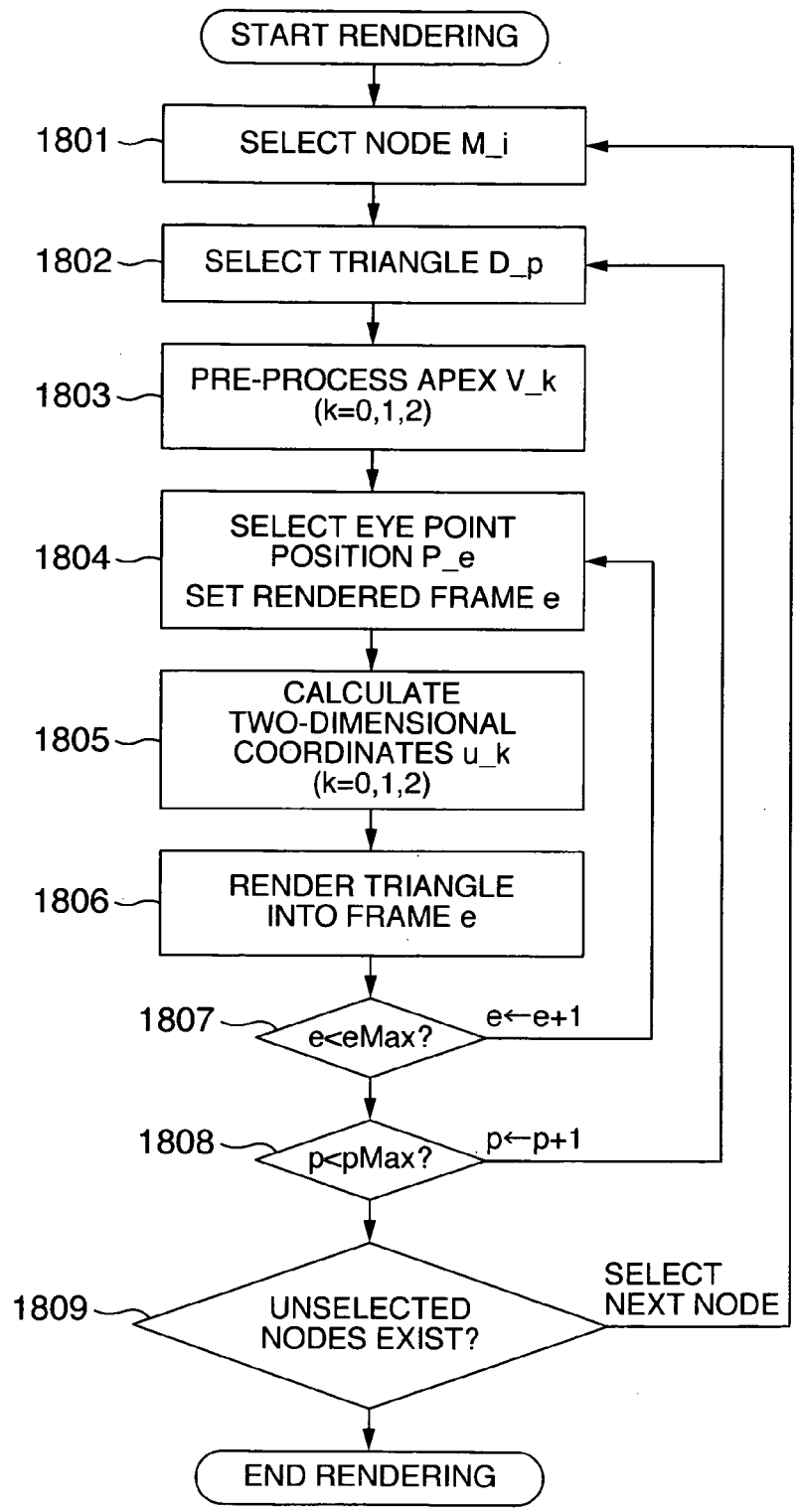

FIG.19

| | |
|---|---|
| POSITION VECTOR (v_k) x-COMPONENT | ~1901 |
| POSITION VECTOR (v_k) y-COMPONENT | ~1902 |
| POSITION VECTOR (v_k) z-COMPONENT | ~1903 |
| TEXTURE COORDINATE u-COMPONENT | ~1904 |
| POSITION VECTOR x-COMPONENT | ~1905 |
| WEIGHTING DATA | ~1906 |
| GLOBAL POSITION (vs_k) x-COMPONENT | ~1907 |
| GLOBAL POSITION (vs_k) y-COMPONENT | ~1908 |
| GLOBAL POSITION (vs_k) z-COMPONENT | ~1909 |
| NODE REFERENCE NUMBER sn_k1 | ~1910 |
| NODE REFERENCE NUMBER sn_k2 | ~1911 |
| NODE WEIGHTING VALUE sw_k1 | ~1912 |
| NODE WEIGHTING VALUE sw_k2 | ~1913 |

FIG.20

| | |
|---|---|
| NODE NUMBER i | ~2001 |
| REFERENCE POINTER TO PARENT NODE | ~2002 |
| REFERENCE POINTER 1 TO CHILD NODE<br>REFERENCE POINTER 2 TO CHILD NODE<br>. . . | ~2003 |
| ROTATION MATRIX (LOCAL) $R\_i$<br>$R\_{11}\ R\_{12}\ R\_{13}$<br>$R\_{21}\ R\_{12}\ R\_{12}$<br>$R\_{12}\ R\_{12}\ R\_{33}$ | ~2004 |
| MOTION VECTOR (LOCAL) $t\_i$<br>$t\_{i1},\ t\_{i2},\ t\_{i3}$ | ~2005 |
| ROTATION MATRIX (GLOBAL) $Rs\_i$ | |
| MOTION VECTOR (GLOBAL) $ts\_i$ | ~2006 |
| SCHEME SWITCHING FLAG $c\_i$ | ~2007 |

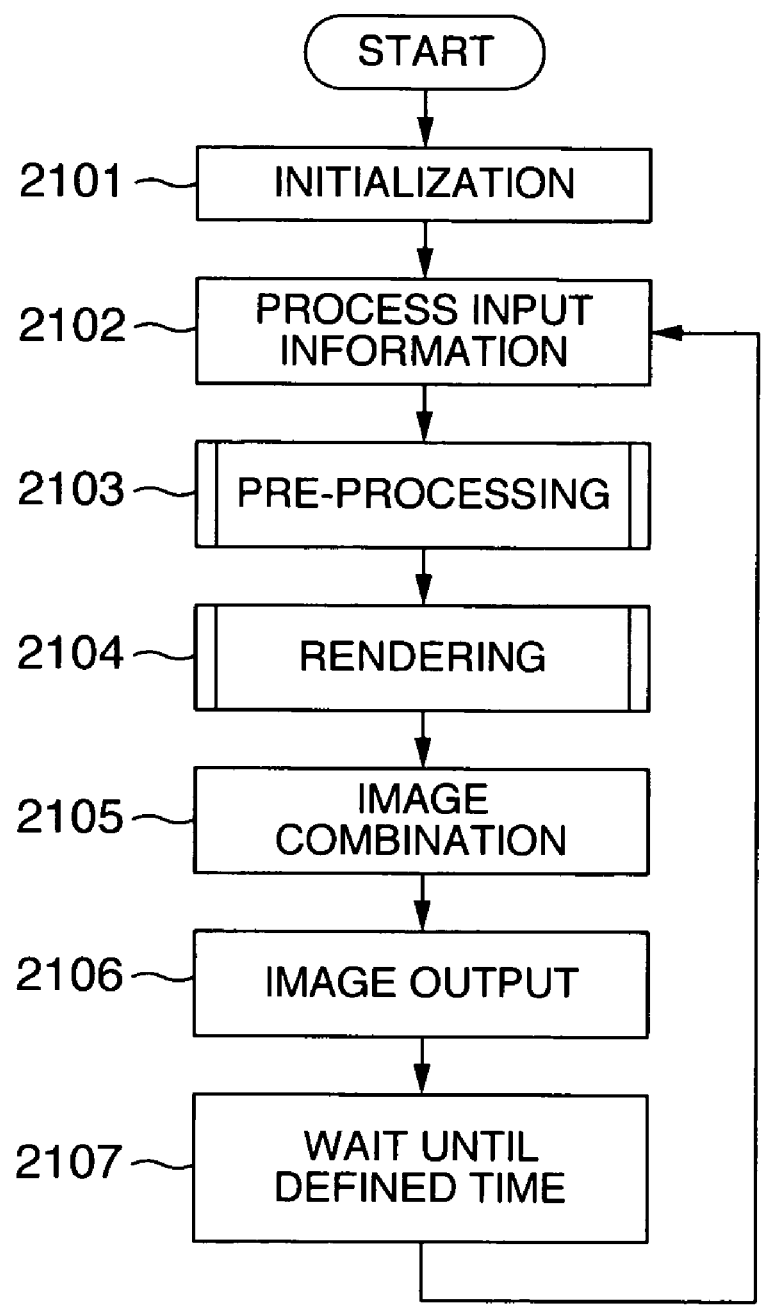

FIG.24
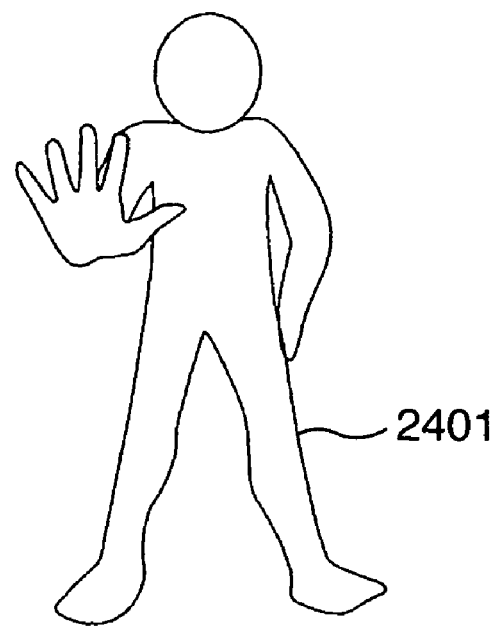
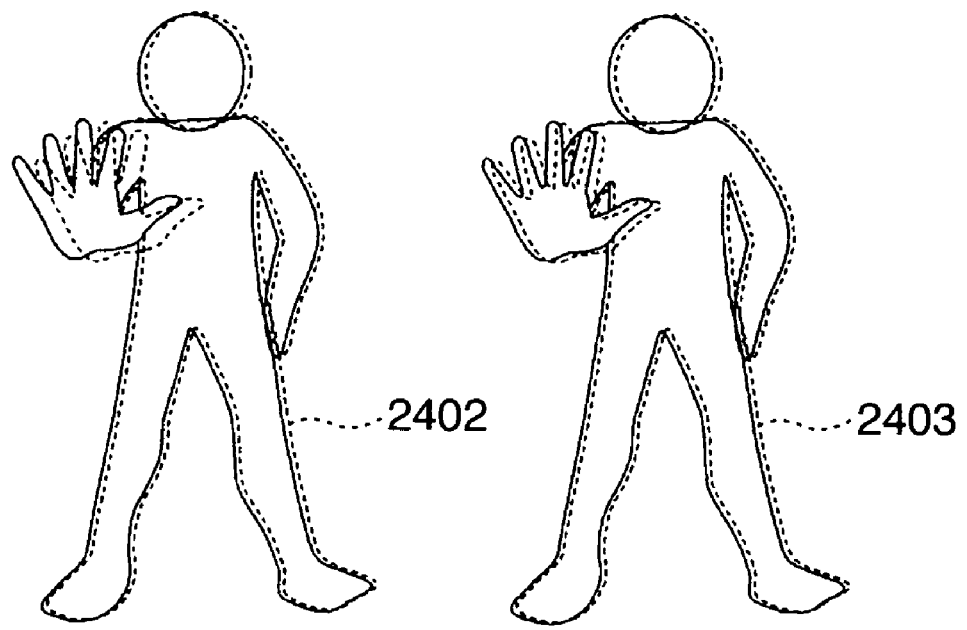

STEREOSCOPIC PICTURE GENERATING APPARATUS

The present application claims priority from Japanese application JP2005-115236 filed on Apr. 13, 2005, the content of which is hereby incorporated by reference into this application.

BACKGROUND OF THE INVENTION

The present invention relates to an apparatus for creating a stereoscopic picture for presentation.

Stereoscopic picture creation techniques provide a stereoscopic sense by projecting subtly different pictures into both eyes of an observer through a display or by allowing different pictures to appear when the observer moves the eyes.

For presenting a stereoscopic picture, it is necessary to assume a plurality of eye point positions in front of a display and create pictures viewed from the respective eye point positions. A difference produced between pictures viewed at different eye points is called "parallax." However, a user can feel fatigue when he views a stereoscopic picture displayed by an apparatus which produces a three-dimensional model based on the foregoing principles for presentation as the stereoscopic picture. Particularly, when using a random dot stereogram approach or the like, image information fed to each eye point cannot be sufficiently separated in many cases, and such a stereoscopic display experiences difficulties in presenting pictures which largely differ in parallax among images, i.e., a picture which has a large protrusion amount.

Thus, the amount of parallax alone is controlled in accordance with a certain rule to create a picture which causes the user to feel less fatigue (see JP-A-11-355808).

SUMMARY OF THE INVENTION

In a video system described in JP-A-11-355808, when objects, which significantly differ in depth distance from one another, are mixed in a background, a foreground and the like which exist within a screen, great emphasis is placed on parallax caused by the depths among these objects, so that it is difficult to sufficiently observe the solidity of the objects themselves and the like while deleting excessive parallax. For example, when there is a remote background 201, a main object 202, a close-range view 203 and the like with respect to an eye point position 200 as shown in an example of FIG. 2, the background 201 and close-range view 203 would suffer from excessive parallax if the amount of parallax were controlled to be uniform in agreement with the main object 202. On the other hand, if an attempt is made to reduce the parallax between the background 201 and close-range view 203 below a certain amount, the important main object 202 would lose a stereoscopic sense as a shape. Also, when the background is mapped to a plane, a movable range is limited in walk through processing for moving a virtual eye point position.

To solve the problem mentioned above, a stereoscopic picture generating apparatus of the present invention includes a storage device for storing information indicative of positions of a plurality of preset eye points, and a processing unit for creating a stereoscopic picture based on the information. The processing unit creates a two-dimensional image using a projection conversion which applies each model part with different parameters generated for each part of a model based on a predetermined calculation.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing the relationship between a stereoscopic display and eye point positions;

FIG. 2 is a diagram showing the relationship between objects at a far range and at a close range;

FIG. 9 is a diagram showing a data structure representing information for managing a three-dimensional model in the first embodiment;

FIG. 15 is a diagram showing a data structure representing information for managing a three-dimensional model in the second embodiment;

FIG. 18 is a flow diagram illustrating rendering processing steps in the second embodiment;

FIG. 19 is a diagram showing an apex data structure for a three-dimensional model in a third embodiment;

FIG. 20 is a diagram showing a data structure representing information for managing a three-dimensional model in the third embodiment;

FIG. 21 is a flow diagram illustrating a sequence of operations in the third embodiment;

FIG. 24 is a diagram illustrating a displayed image showing effects produced by applying the first embodiment.

DESCRIPTION OF THE EMBODIMENTS

Embodiments of the present invention will hereinafter be described with reference to the accompanying drawings.

First Embodiment

Figure 10:
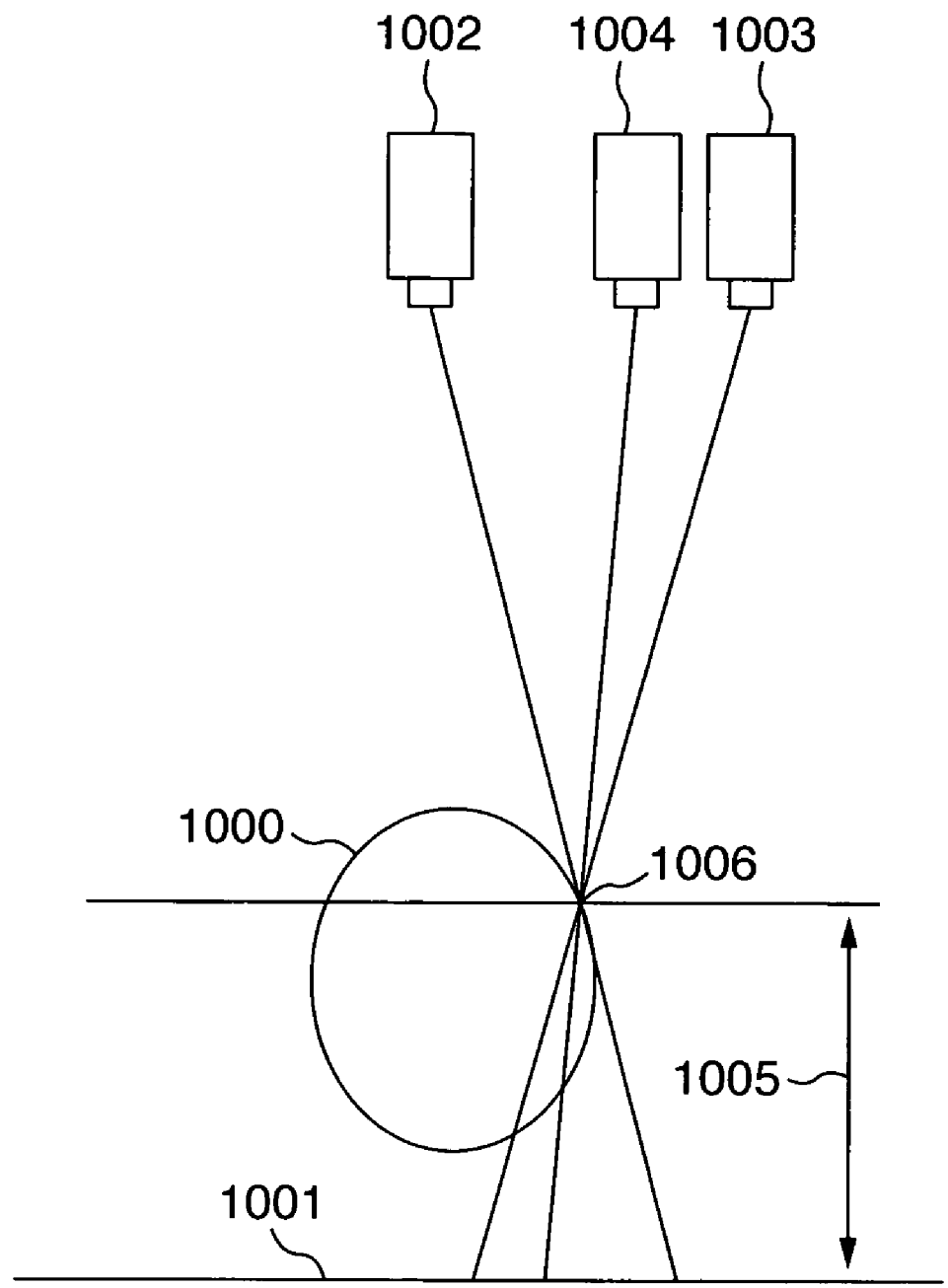
FIG. 10 is a diagram showing how a parallax amount is controlled in the first embodiment.

FIG. 10 is a diagram showing how parallax is reduced by narrowing down the spacing between virtual cameras in accordance with the amount of protrusion in order to prevent excessive parallax in a protruding portion according to this embodiment.

When a three-dimensional model 1000 viewed from an eye point position 1002 and an eye point position 1003 is rendered on a screen plane 1001 corresponding to a display, an interior division point 1004 is set between the eye point positions 1002, 1003 in accordance with the distance 1005 from an apex position 1006 of the three-dimensional model 1000 to be rendered and the screen plane 1001, and the three-dimensional model 1000 is rendered at an eye point position 1004 in place of the eye point position 1003. Also, constraint conditions are imposed on the setting of the interior division point 1004 such that the amount of parallax does not reverse for the models sequentially rendered on the screen.

FIG. 24 is a diagram illustrating an example of a displayed image which shows an effect produced by applying the first embodiment. A human stretching a hand in front, as shown by a FIG. 2401, is rendered with parallax. A FIG. 2402 represents images of a stationary human with a hand stretched in front for two eye points with parallax assigned to each part by a solid line and a dotted line. When the amount of parallax added to the stretched hand exceeds a tolerance of a stereoscopic sense representable in a video display system, the parallax is restrained within an upper limit as the figure of fingers in a FIG. 2403 using this embodiment.

Also, as shown in the first embodiment and a third embodiment, when an interior division point is selected with importance placed on the smoothness at joints, there are two types of methods for selecting an internal division point in order to represent linear portions of a model as they maintains the linearity. A system described in a fourth embodiment realizes a effect of selecting and mixing these methods of selecting an interior division point for each part of an object.

Figure 4:
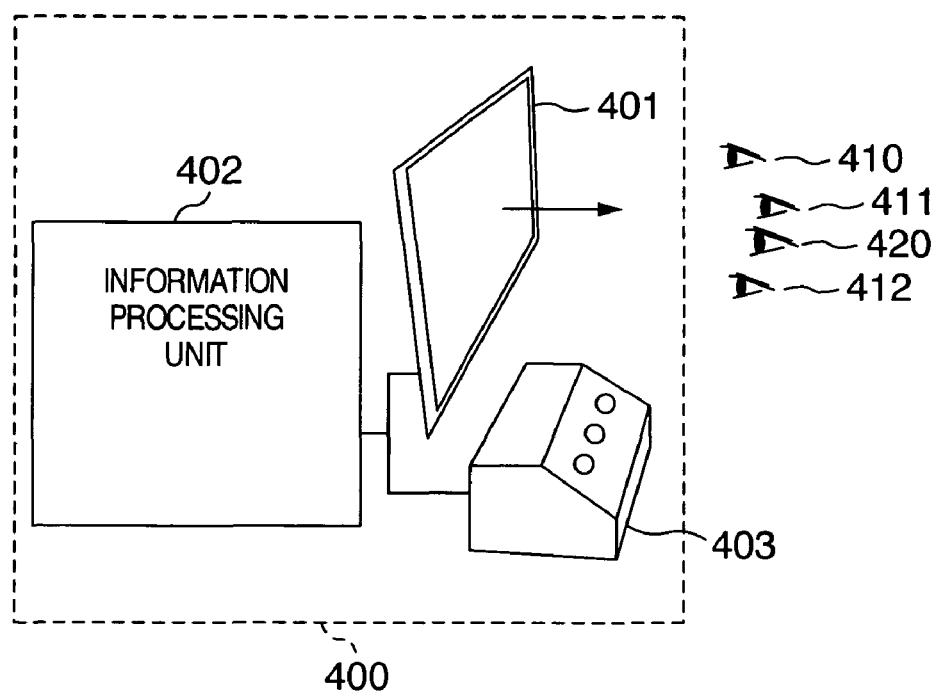
FIG. 4 is a diagram illustrating an apparatus according to a first embodiment of the present invention.

The first embodiment will be described with reference to FIG. 4. A stereoscopic picture generating apparatus 400 comprises a display (image presentation unit) 401 for presenting a different picture in accordance with the position of an eye point; an information processing unit 402 for generating a picture which is transferred to the display 401; and an interface unit 403 for controlling picture contents. 410-412 indicate the positions of eye points which are assumed when the display 401 is designed. A different picture is presented for each of these positions.

As mentioned above, there are a large number of existing approaches for presenting pictures viewed at respective eye points separated from one eye point to another. 104-106 in FIG. 1 indicate the positions of eye points which are assumed when a display 100 is designed. In a stereoscopic display system, different pictures 111-113 are created for these positions of eye points, and combined in conformity to the design of the display 100. Overlapping pictures 101-103 displayed on the display 100 are separated in conformity to the aforementioned system, and are observed only from the respective eye point positions 104-106. When any of a variety of existing stereoscopic display systems is used, a plurality of eye point positions are assumed at visible positions of the display, such as 104-106 in FIG. 1, and respective pictures 110-113 projected thereto are created, combined, and processed for projection.

An eye point position 420 is a spatial average of the respective three-dimensional positional coordinates of 410-412, and represents these eye points. However, a median value, a weighted average, and the like can also be used for the point 420, other than the arithmetic average. This eye point position 420 is used as a representative point when each eye point position is handled. In the following description, 410-412 are called multocular eye point positions (R), and 420 a central eye point position (R). These positions are represented using positions of three-dimensional orthogonal coordinates on an actual space. This orthogonal coordinate system is defined such that the origin (0, 0, 0) exists on the plane of the display 401 (or its expanded plane), and a central eye point position is located at (0, 0, 1).

Figure 5:
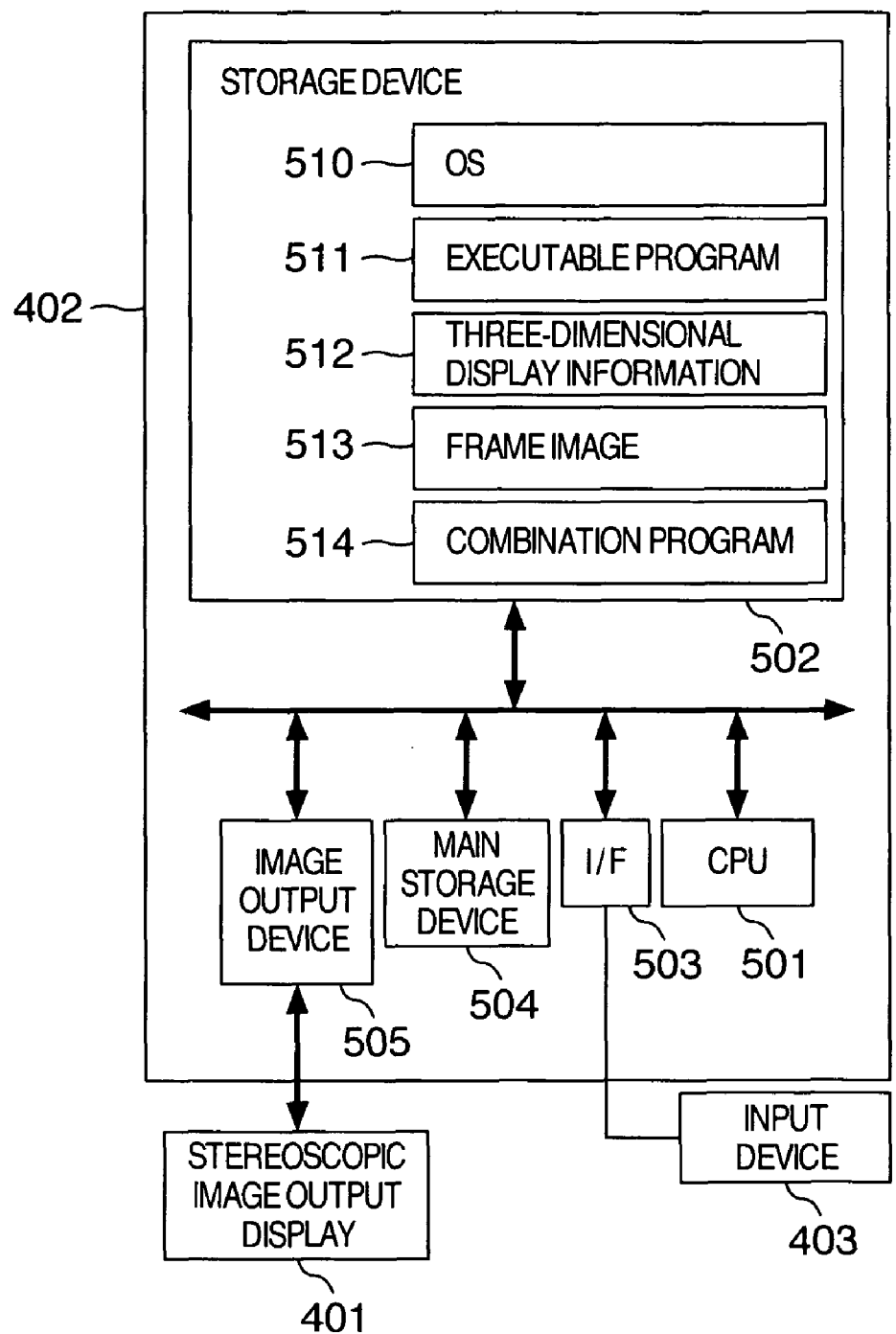
FIG. 5 is a block diagram illustrating the configuration of an information processing apparatus.

FIG. 5 is a diagram illustrating the configuration of the information processing unit 402 for creating and processing images. A CPU (central processing unit) 501 reads a program stored in a storage device 502 into a main storage device 504 for execution. Then, the CPU 501 updates three-dimensional display information 512 and a frame image 513, later described, and outputs their contents to an image output device 505.

The storage device 504 stores an OS 510, an executable program 511, three-dimensional display information 512, frame image 513, combination program 514, and the like.

The OS 510 is a common program for performing generic processing of the CPU 501, while the executable program 511 is a program for the CPU 501 to process information.

The three-dimensional display information 511 comprises information required to make three-dimensional displays, such as information related to a three-dimensional model, information indicative of the positions of a plurality of preset eye points, information on the position of a light source, information on special effects such as fog, but are not so limited.

The image frame 513 is a rendered picture built through calculations of the CPU 501, and is made up of the same number of image data as the number of eye point positions 410-412 assumed by the display 401.

The combination program 514 is a program created in conformity to an image display scheme of the display 401, and comprises, for example, functions for converting and combining the image frame 513 to an input format required by the display 401, and transferring data to the display 401 through the image output device 505.

While the storage device 504 is typically a magnetic disk, another storage medium such as an optical disk may be used instead.

The I/F unit 503 transfers data necessary for communicating input and output data between the input device 403 which receives instructions from the user and the information processing unit 402.

The image output device 505 is a device for displaying an image on the display 401. Data within this device is converted to an image signal which adopt to an image format of the stereoscopic display 401 and sent onto the display 401 every fixed time.

The contents of the combination program 514 executed by the CPU 501 differs depending on the installation of the display 401. An approach most often used for presenting binocular parallax is a method of giving two different pictures to both eyes using glasses having a filtering function for selectively passing the pictures, or the like. This scheme includes one which separates pictures using a polarizing filter, one which separates pictures using a color separation filter that absorbs different light of red and blue, one which switches left and right pictures in time division for display, and the like. On the other hand, one called a random dot stereogram provides a feature for giving different color information in accordance with a position on a space, without using special glasses or the like, as a mechanism on the display side. As this type of stereogram, a parallax barrier method, one using a lenticular lens, a lens array system which has small lenses spread all over are well known.

While this embodiment gives an example of a lens array scheme, this embodiment can be also applied to other types of stereoscopic projection approaches by changing the number of eye points and the eye point positions of this embodiment.

In the random dot stereogram scheme using a lens array assumed by this embodiment, pixels from an appropriate frame are sampled and positioned in accordance with a relative positional relationship between each pixel and a lens existing thereon. Giving an example of using approaches other than such a random dot stereogram, a method of combining a red component with a blue component for color information of each pixel from two images is taken when a binocular presentation apparatus using red and blue filters are used, while a method of switching and transmitting images at two eye point positions on a display-by-display basis is taken in a binocular presentation apparatus using a time-series filter. This embodiment is directed to control and build an image for each of a plurality of eye point positions (or an approach for sampling color information therefor) as a pre-stage of such a combination, and does not depend on which approach is used for combining each image for transmission to a stereoscopic presentation section.

Figure 6:
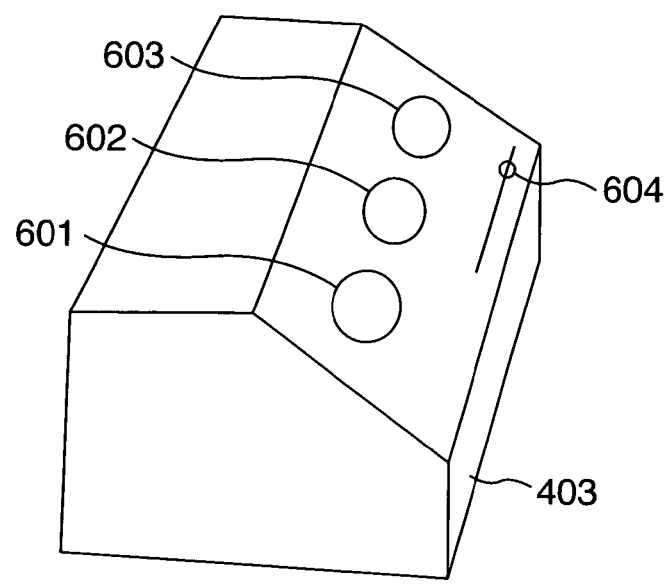
FIG. 6 is a perspective view illustrating a user interface unit in the first embodiment.

FIG. 6 is a diagram illustrating the interface unit 403 for accepting entries from the user. Existing methods such as a touch panel, a button, a lever and the like can be used for implementing each of input device sections 601-604 of this interface unit, and information from these input devices can be received by the information processing unit 402 as digital signals. An input device 601 having three degrees of freedom is configured to change the position of an eye point in a virtual space, and an input device 602 having three degree of freedom is configured to change the angle at an eye point. An input device 603 having one degree of freedom is configured to control the perspective of protrusion. An input device 604 helps the input device 603, and is a switch for selecting which parameter is being manipulated by the input device 603 among an integer number of controllable parameters. Contents controlled by each input device relates to characteristic operations of this embodiment, and will be discussed in accordance with an operation flow of the embodiment later described.

Figure 7:
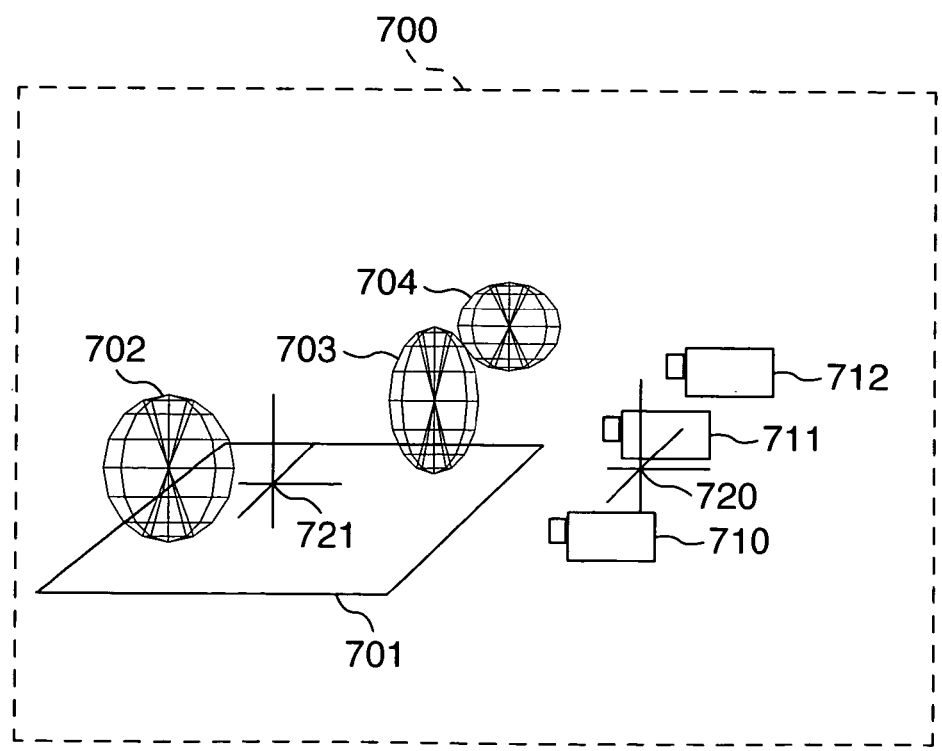
FIG. 7 is a diagram illustrating a virtual space presented by a stereoscopic display.

FIG. 7 is a diagram showing three-dimensional data intended for display in stereoscopy, eye point positions, and a positional relationship therebetween. In the following description, the relationship between these stereoscopic data and position data is called a virtual space 700. Data of a three-dimensional model, indicated by 701-704, are made up of multiple triangles. This model data has been previously created and preserved in the external storage device 504. For each of triangles making up these geometric shapes, color information is determined with reference to separately prepared images called textures. For determining where in the texture image each portion of the model takes sampling data, a value called a UV value has been prepared at each apex.

Data 720 indicates the position of an eye point in the virtual space. This eye point position corresponds to a central eye point position (R) in front of the display. In the following, this position on the virtual space is called the central eye point position (V).

Also, icons labeled 710-712 indicate eye point positions on the virtual space corresponding to the eye point positions 410-412, respectively. They are called the multocular eye point positions (V). The multocular eye point positions (V) corresponding to these multocular eye point positions (R) take the same values as the multocular eye point positions (V), and are preserved in the external storage device as a three-dimensional vector matrix made up of floating point numbers. In the following, the value of this array is labeled p_e, where e is an index value for discriminating the multocular eye point positions (V).

Figure 8:
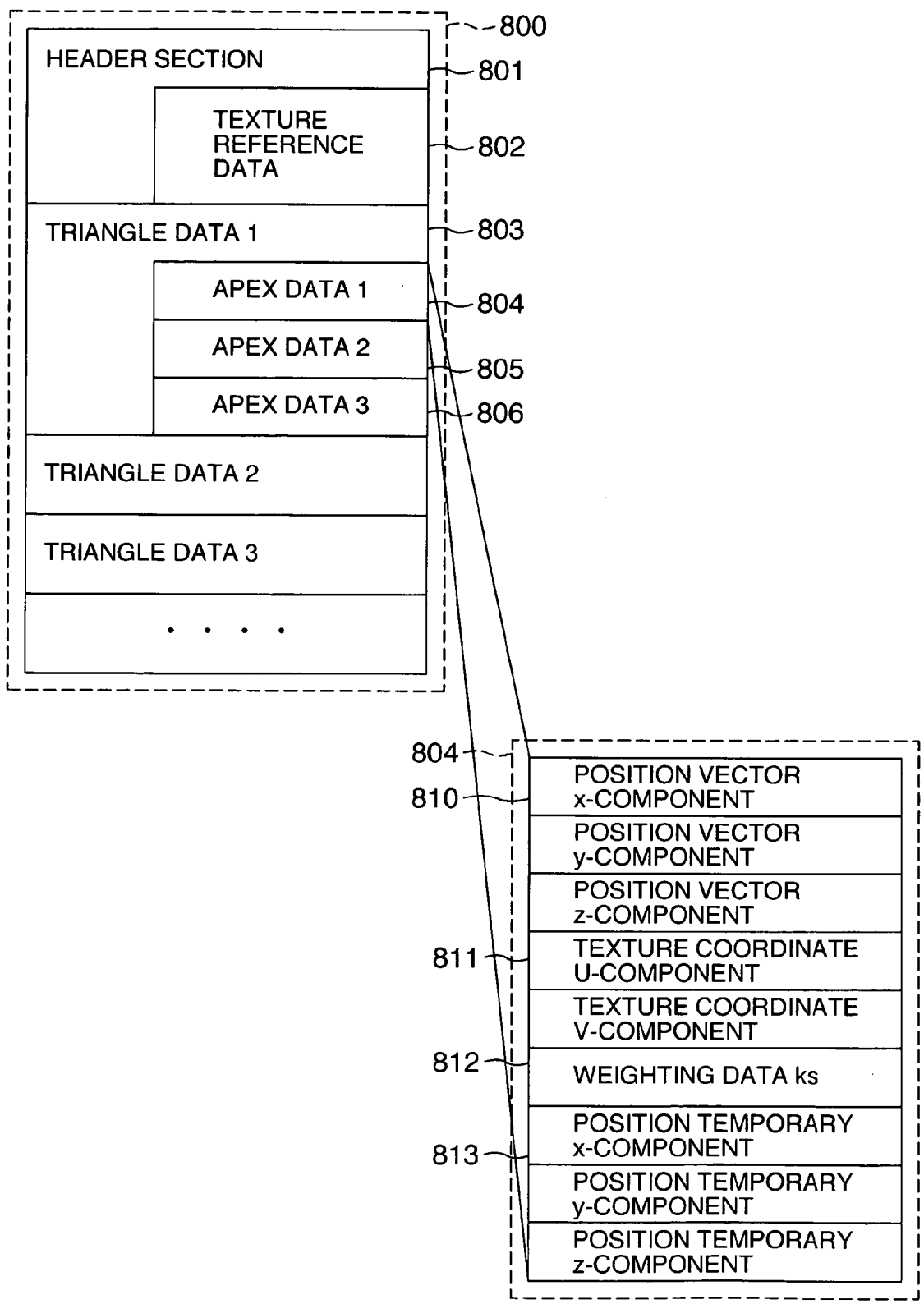
FIG. 8 is a diagram showing a data structure of a three-dimensional model in the first embodiment.

FIG. 8 is a diagram showing a data structure of a three-dimensional model. Model data 800 comprises a header section 801 and a shape data section. The header section describes information (802) on a referenced texture image. The shape of a model is represented by a list of triangle data structures 803. Each triangle is made up of a set of three apex data, such as 804-806 in FIG. 8. One apex data 804 includes three-dimensional positional information 810, a UV coordinate value 811, a temporary area 813 used in subsequent calculations, and data 812 on a weighting value. The positional information is a three-dimensional vector indicative of the position of the apex. The UV coordinate value is a two-dimensional vector value indicating where in the texture image the apex corresponds to. Also, a value ks preserved in 812 is a value used in an emphasizing operation of the law of perspective, and is called a parallax control value of the apex. A method of utilizing this data will be described in accordance with an operational procedure of the embodiment later described.

FIG. 9 is a diagram showing the structure of data representative of model management information. This is data which is a collection of information for positioning three-dimensional model data in the virtual space 700, and a reference pointer to a three-dimensional model held by this data is preserved at 901. An object indicative of this 901 is positioned in the virtual space based on three-dimensional vector data indicative of the amount of translation, and data of a rotation matrix. An area 905 stores local positional information t_p, an area 907 stores a vector representing global positional information ts_p, an area 904 stores local rotation information R_p, an area 906 stores a vector representative of global positional information Rs_p, where p is a reference letter indicative of the number of the object. Also, a variable area made up of four values w, k, w_0, d are provided. They are parameter data for performing weighting processing of the law of perspective, controlled by interactive manipulations, later described, and are called a weighting value, a model parallax control amount, a desired weighting value, and a display depth, respectively.

Also, the entire management information is preserved in the external storage device 504 in a tree structure including the data structure of FIG. 9 positioned at a node. Data 902 is address information for referencing a node which is a parent of this node, and data 903 is address information for referencing a node which is a child of this node. This three structure is determined by a positional relationship of the model on the virtual space 700. There is a parent/child relationship between two models which are in contact with each other in the virtual space 700, where a node m being a parent of a node n means that the model n is positioned on the model m. When the model n is positioned on the model m, a joint t_n of the model m with the model n is positional information represented by a three-dimensional vector in a local coordinate system of the model m. Also, rotation information of model m is indicated by a 3×3 three-dimensional rotation matrix R_n at the coordinates of the model m. In this embodiment, the model m and the model n are in contact at the origin (0, 0, 0) of the model n and the point t_n at which the model n is positioned on the model m, and the three-dimensional coordinates x_n of the model n can be represented by x_m=R_n·x_n+t_n in the coordinate system of the model m.

Also, data which is a root of this tree structure is preserved in the storage device 502. This data is called the root node. The root node has three-dimensional positional information ts_0, a three-dimensional rotation matrix Rs_0, and a magnification ratio a, and has address information for referencing data of a child. A position vector x in the coordinate system of a direct child node of the root node is represented by a(Rs_0, x+ts_0) in the coordinate system of the central eye point position (V). The coordinate system determined by this root node is a coordinate system of an entire scene, and is hereinafter called the global coordinate system. This global coordinate system is an orthogonal coordinate system which has an origin (0, 0, 0) at the center of the scene determined by the coordinate data ts_0, and has a point of the central eye point position (V) at (0, 0, −1). A movement of an eye point position and a rotation manipulation by the input systems 601 and 602 are implemented by controlling the central position and the central eye point position (V) of this scene.

Here, the scene refers to a landscape in a virtual world build by a model viewed from a certain eye point position.

Figure 11:
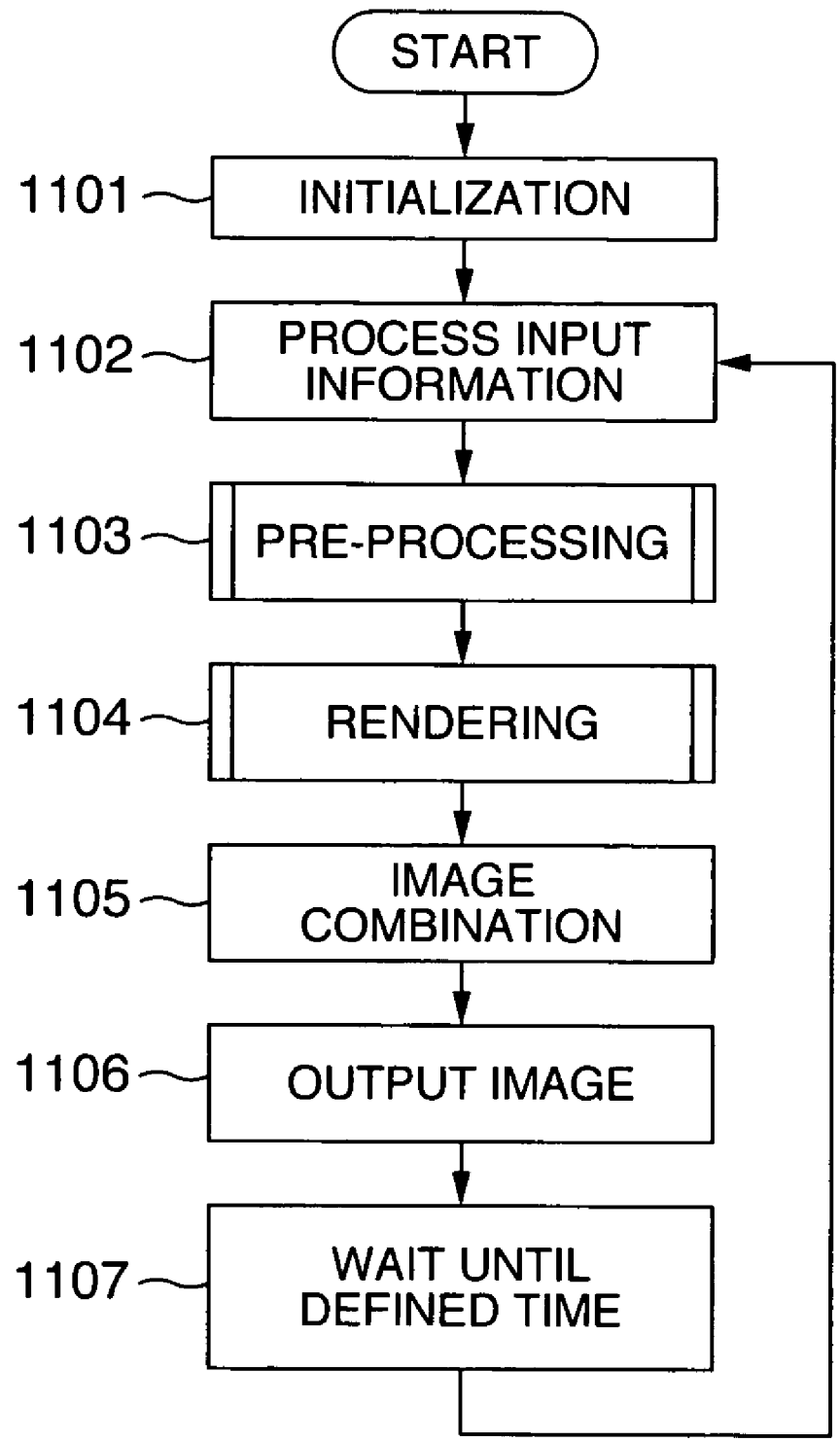
FIG. 11 is a flow diagram illustrating a sequence of operations in the first embodiment.

FIG. 11 is a flow diagram illustrating a sequence of operations in this embodiment.

The CPU 501 initializes a variety of data (step 1101). Specifically, an initial value of each data is read from the external storage device 604 into the main storage device 602. Here, read data 512 includes data 900 on a geometric shape and associated control information 900, and an array of three-dimensional vector data p_e representative of the multocular eye point positions (V). Also, for creating information on an initial state of the root node, three-dimensional positional information t_00, three-dimensional rotation matrix R_00, and magnification ratio a0 are read, a calculation is made such as Equation 1, and the result is stored in the structure of the root node. In Equation 1, a_0R_00 represents a manipulation of multiplying the matrix R_00 by a constant a_0, and a left-headed arrow represents a substitution manipulation.

$$Rs_0 \leftarrow a_0 R_{00}$$

$$ts_0 \leftarrow t_{00} \qquad \text{[Equation 1]}$$

Also, at step 1101, the CPU 501 creates a projection matrix P_e for each of the aforementioned central eye point positions (V) and multocular eye point position (V), and preserves the data on the main storage device 504. Here, e represents an index value for referencing data from an array variable on the main storage 502, 0 represents the central eye point position (V), 1 to eMax represent respective values of the multocular eye point positions (V). Initial values of a projection conversion matrix for creating an image at the central eye point position (V) are calculated using Equation 2, and the data is preserved on the main storage device 504. Here, f_x, f_y represent vertical and horizontal values on the display plane calculated in the three-dimensional orthogonal coordinate system, p_0x and p_0y represent coordinate values indicative of the central position of the display in the same coordinate system.

$$P_0 = \begin{bmatrix} f_x & 0 & p_{0x} \\ 0 & f_y & p_{0x} \\ 0 & 0 & 1 \end{bmatrix} \qquad \text{[Equation 2]}$$

Also, when an e-th element of each multocular eye point position (V) is represented by a three-dimensional vector p_e=[p_ex, p_ey, p_ez], the CPU 501 calculates initial values of a projection conversion matrix for creating an image at this eye point as expressed by Equation 3, and preserves the initial values in the main storage device 504. f_x, f_y represent the vertical and horizontal values of the display plane measured in three-dimensional orthogonal coordinate system similar to the foregoing, and p_0x and p_0y represent coordinate values indicative of the central position of the display at the multocular eye point position (V) in the same coordinate system.

$$P_e = \begin{bmatrix} f_x & 0 & p_{0x} - p_{ex} \\ 0 & f_y & p_{yj} - p_{ex} \\ 0 & 0 & 1 \end{bmatrix} \qquad \text{[Expression 3]}$$

This embodiment continues to display a three-dimensional picture by repeating the operations from step 1102 to step 1107.

The CPU 501 updates eye point position data and perspective parameters using data sent from the input device 403 (step 1102). A signal having three degrees of freedom sent from the input device 601 is received as three variables v_1, v_2, v_3, where v_x, v_y, v_z are values, the absolute values of which are equal to or less than a fixed value vmax, centered at zero. rmax represents a limit value for a moving speed of eye point control. Information on data for creating scene coordinates is rewritten as expressed by Equation 4 using these values.

$$ts_0 \leftarrow ts_0 + \begin{bmatrix} v_1 \\ v_2 \\ v_3 \end{bmatrix} \qquad \text{[Equation 4]}$$

The CPU 501 also receives a signal having three degrees of freedom sent from the input device 602 as three variables r_1, r_2, r_3, where r_1, r_2 are decimal fractions, the absolute values of which are equal to or less than the limit value rmax for the moving speed of the eye point control, centered at zero, and r_3 is a value in a range 0.5<r_3<2.0. Elements of the rotation matrix R_0 of the scene coordinates are rewritten as expressed by Equation 5 using these values.

$$Rs_0 \leftarrow Rs_0 \cdot r_3 \cdot \begin{bmatrix} \cos r_1 & 0 & -\sin r_1 \\ 0 & 1 & 0 \\ \sin r_1 & 0 & \cos r_1 \end{bmatrix} \begin{bmatrix} 1 & 0 & 0 \\ 0 & \cos r_2 & -\sin r_2 \\ 0 & \sin r_2 & \cos r_2 \end{bmatrix} \qquad \text{[Equation 5]}$$

Also, a signal having one degree of freedom sent from the input device 603 is labeled w2 which is a floating point value in a range 0.5<r_3<2.0. An integer value sent from the input device 604 is labeled w3. The value of w0 of each scene node is updated as expressed by Equation 6 using these values.

$$w0_i \leftarrow w0_i \quad (\text{if } i \neq w3)$$

$$w0_i \leftarrow w0_i \cdot w2 \quad (\text{if } i = w3) \qquad \text{[Equation 6]}$$

where w0_i represents the value of a w0 variable of an i-th scene node.

Figure 12:
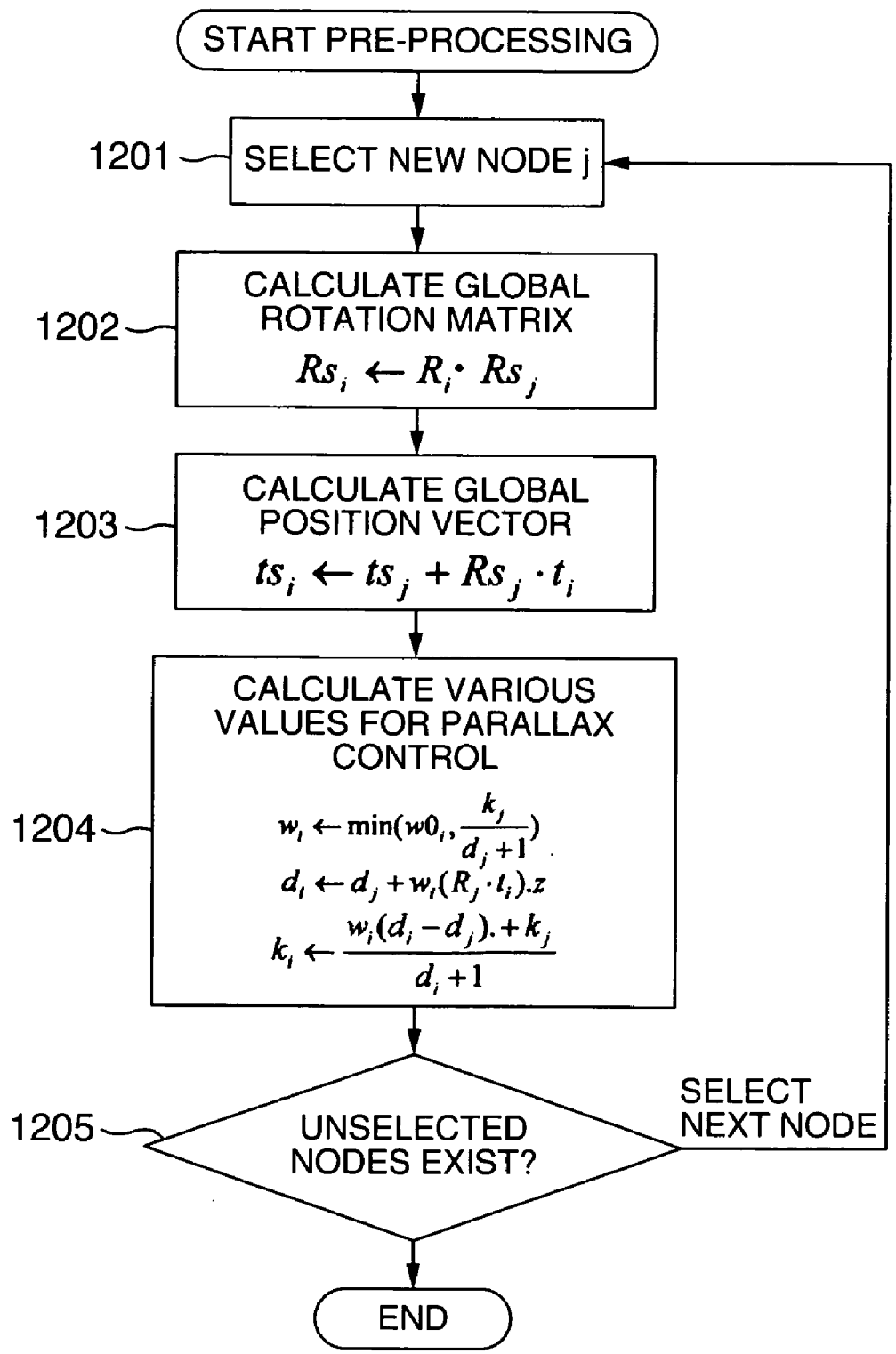
FIG. 12 is a flow diagram illustrating rendering pre-processing steps in the first embodiment.

At step 1103, the CPU 501 performs pre-processing for a geometric information conversion for each model. The CPU 501 calculates the position in the current scene coordinate system for each of the apexes of the data 512. The contents of processing performed at this pre-processing step 1103 are shown in a flow diagram of FIG. 12.

The CPU 501 selects an unselected node (step 1201). In this event, the CPU 501 selects a node by recursively tracing the tree structure of the scene in order from the reference address of the root node. While there are several different existing approaches for the selection of the order in which the tree structure is traced in this manner, an appropriate approach should be used to satisfy the condition that a parent is called prior to a child. A node selected in this manner is subjected to processing at steps 1202-1205. The number of the selected node is substituted into a variable i, and the number of a parent of the selected node i described in the data area 902 is substituted into a variable j.

The CPU 501 calculates a global rotation matrix Rs_i for a model M_i indicated by the selected node (step 1202). The value of this product is calculated as expressed by Equation 7 for a global rotation matrix Rs_j of the coordinate system of the parent, and a local rotation matrix R_i of the model, and the result is recorded at the position 903 of the structure 900 as the global rotation matrix Rs_i of the model M_i.

$$Rs_i \leftarrow R_i \cdot Rs_j \quad \text{[Equation 7]}$$

The CPU 501 calculates Equation 8 from a global origin central position Ts_j of the parent model, a local positional coordinate t_i of the child model, and the global rotation matrix Rs_j of the parent model, and preserves the value in the variable 904 of the structure 900 as the global origin central position Ts_i of this model (step 1203).

$$ts_i \leftarrow ts_j + Rs_j \cdot t_i \quad \text{[Equation 8]}$$

The CPU 501 calculates values for a variety of projection matrix controls for the model to prevent the parallax amount from reversing (step 1204). Equation 9 is calculated from a display depth d_j and a parallax control value k_j of the parent model, and a desired value w0_i for a weighting value of this model to set a weighting value w_i. The resulting value is preserved in the data 905 of the structure 900 as a parallax control amount k_i of this model.

$$w_i \leftarrow \min\left(w0_i, \frac{k_j}{d_j + 1}\right) \quad \text{[Equation 9]}$$

Then, the CPU 501 calculates a display depth of the model i by Equation 10. (R_j·t_i).z represents a manipulation for taking the value of the z-coordinate of a three-dimensional vector derived by R_j·t_i. This d_i is preserved in the data 905 of the structure 900 as the display depth of the model.

$$d_i \leftarrow d_j + w_i(R_j \cdot t_i).z \quad \text{[Equation 10]}$$

The CPU 501 also calculates the parallax control amount k_i for the model i by Equation 11. The value derived by Equation 11 is preserved in the data 905 of the structure 900 as the parallax control amount k_i of this model.

$$k_i \leftarrow \frac{w_i(d_i - d_j) + k_j}{d_i + 1} \quad \text{[Equation 11]}$$

Now, the calculations at step 1204 have terminated.

When there is an unselected node in the tree structure of the scene, the CPU 501 returns to step 1201 to select the node, and again performs steps 1202-1204 for this node. When the processing at steps 1202-1204 has been completed for all nodes, step 1103 terminates, followed by a transition to step 1104.

Figure 13:
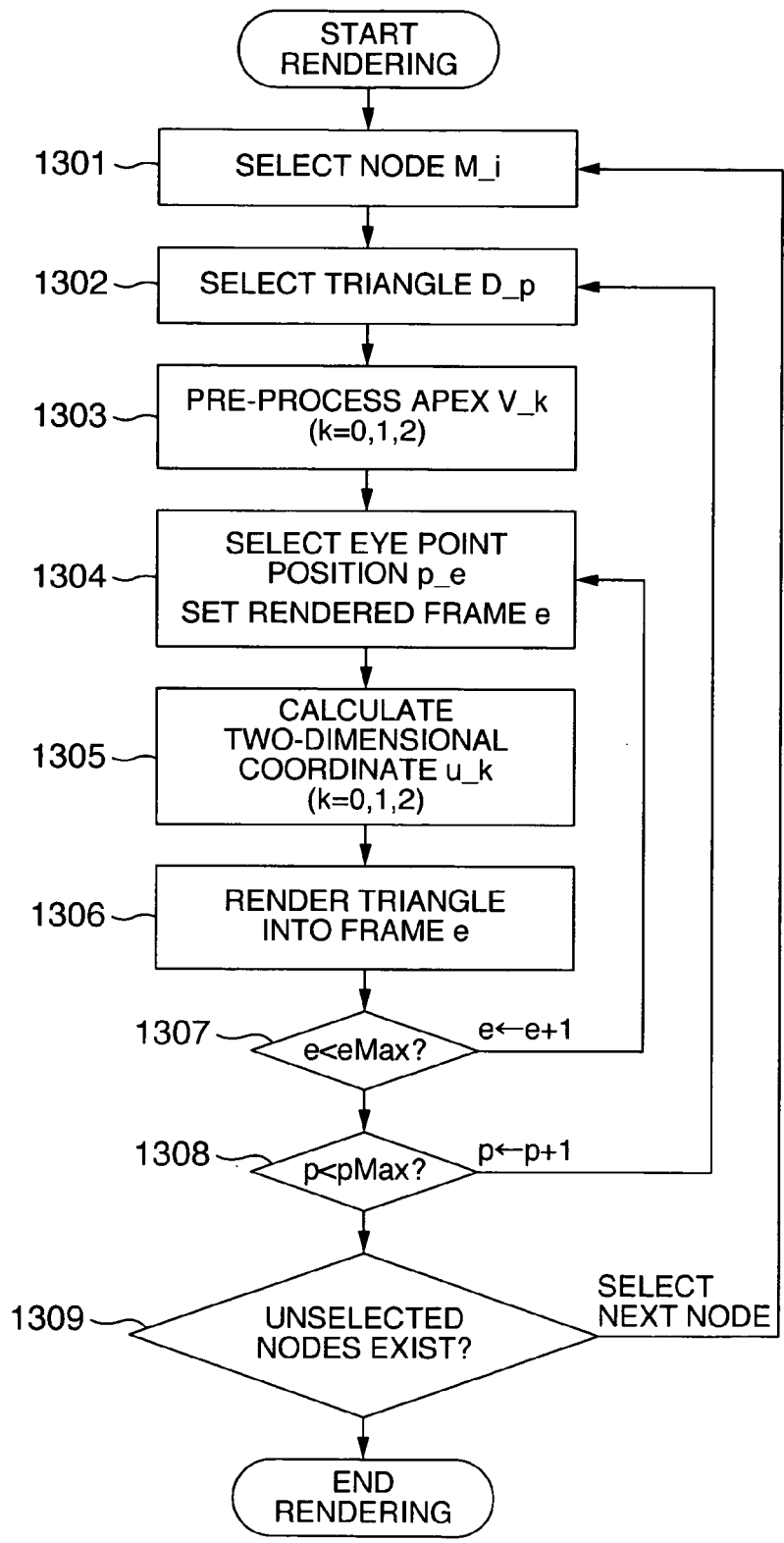
FIG. 13 is a flow diagram illustrating rendering processing steps in the first embodiment.

At step 1104, a three-dimensional geometrical shape of each model is rendered as a two-dimensional image. The contents of processing at this step 1104 will be described with reference to a flow diagram of FIG. 13.

The CPU 501 selects one of unselected models from a tree structure which manages a scene model (step 1301). In this event, the CPU 501 selects a node by recursively tracing the tree structure of the scene in order from a reference address of the root node. The number of this node is substituted into the variable i. This model is hereinafter called the model M_i. Also, a parent node number j of the model M_i is read, and a model indicated by this parent node is labeled M_j. The quantity of triangle data of the model M_j is set to a variable pMax. Also, a variable p is reset to zero.

The CPU 501 selects a p-th element from a triangle data region in the data structure of the model (step 1302). This is labeled the triangle D_p. A variable k is reset to zero. The CPU 501 selects the coordinates at the position of a k-th apex of D_p (step 1303). This is labeled v_k. The CPU 501 performs calculations at step 1304-step 1308 for determining corresponding coordinates u_k in the two-dimensional image.

The CPU 501 performs pre-processing for apex data v_k (step 1303). The CPU 501 reads a scene rotation matrix Rs_j of the parent model, the origin central position Ts_j of the parent model, the display depth d_j of the parent model, and the weighting value w_i of the model. For calculating a global position vector at the apex v_k, the CPU 501 calculates Equation 12 using a global position vector Ts_i of this model, the global rotation matrix Rs_j, and a local position vector v_k of this apex. A value vs_k resulting from Equation 12 is preserved in the area 813 as a global position vector of this scene.

$$vs_k \leftarrow ts_i + Rs_i \cdot v_k \quad \text{[Equation 12]}$$

The CPU 501 also finds an eye point adjusting value k_i for the model M_i, the global rotation matrix Rs_i, and an eye point adjusting value k_for this apex. (Rs_j·v_k).z calculates Rs_j·v_k, and a manipulation for taking its z-component is expressed by Equation 13.

$$ks_k \leftarrow k_i + w_i(Rs_i \cdot v_k).z \quad \text{[Equation 13]}$$

The CPU 501 resets a variable e to an initial value of zero, and performs step 1304. The CPU 501 selects an unselected projection conversion matrix P_e from among the multocular eye point positions (V) (step 1304), where e is a reference letter for discriminating an eye point position. Also, the CPU 501 selects a frame area F[e] corresponding to this P_e. This frame is used as a memory area for rendering an image corresponding to a picture resulting from an observation of the virtual space 700 from the eye point position e.

The CPU 501 calculates a projection matrix P'_k as expressed by Equation 14 using the calculated value ks_k (step 1305).

$$P'_e \leftarrow ks_k \cdot P_0 + (1 - ks_k)P_e \quad \text{[Equation 14]}$$

Figure 14:
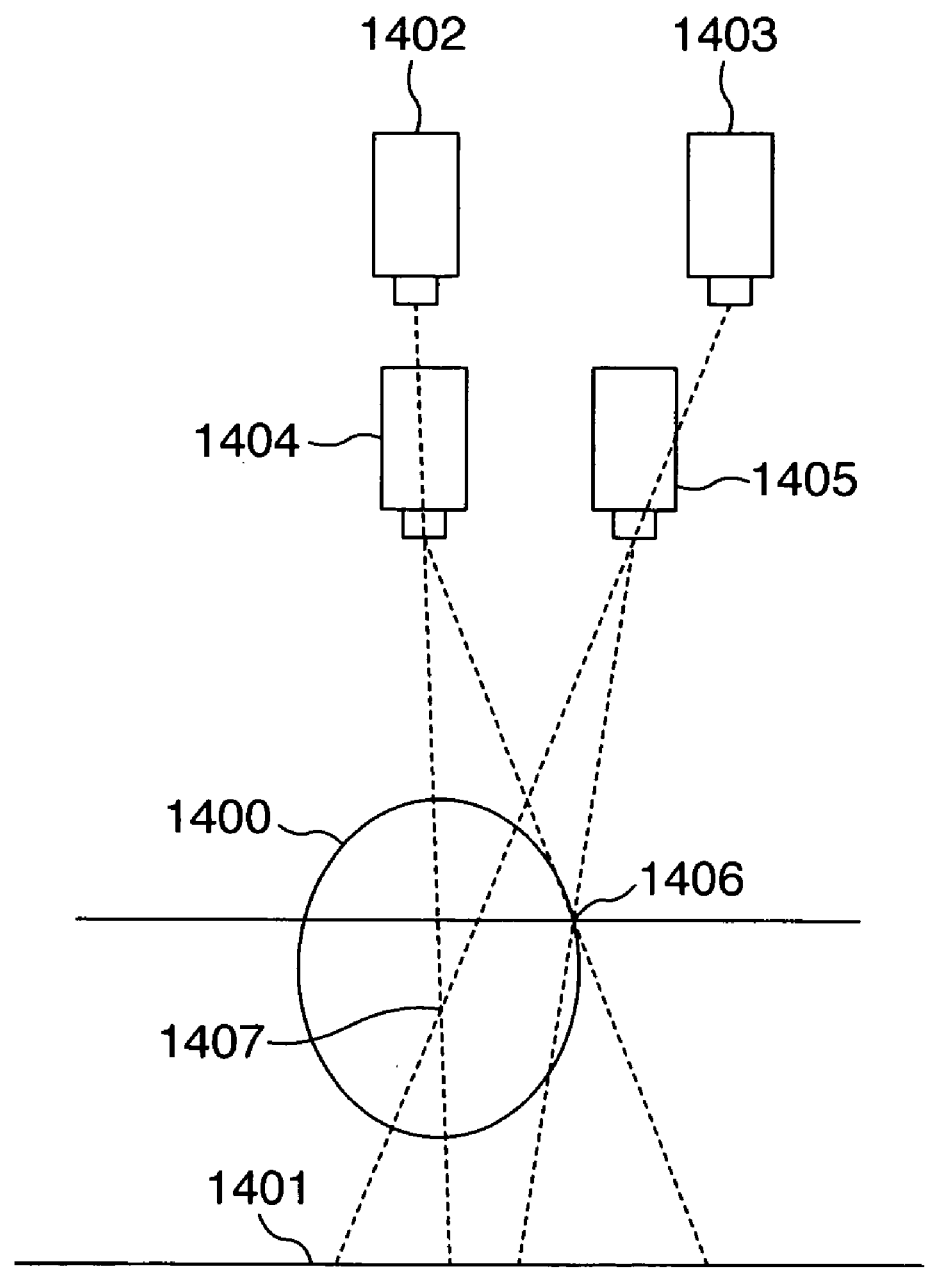
FIG. 14 is a diagram showing how a protective transformation is controlled in a second embodiment.

FIG. 14 is a diagram showing an effect produced by this calculation.

The conversion matrix P'_k is a projection conversion corresponding to a virtual camera 1404 which follows variations in the z-component of the object to move between P_0(1402) and P_i(1403). This P'_k approaches from P_i to P_0 to control the amount of parallax between eye points. Also, with the upper limit determined by Equation 9, the parallax amount will not appear in reverse for variations in the depth direction.

The CPU 501 calculates the positions u_k on the two-dimensional coordinate system for three apexes k=0, 1, 2, as expressed by Equation 15 (step 1305).

$$\begin{bmatrix} ax \\ ay \\ az \end{bmatrix} \leftarrow P'_e \cdot (vs_j - ks_k p_e) u_k \leftarrow \begin{bmatrix} \frac{ax}{az+1} \\ \frac{ay}{az+1} \end{bmatrix} \quad \text{[Equation 15]}$$

The CPU 501 performs a color filling operation for an area defined by the three calculated apexes (step 1306). Color information is sampled from a point corresponding to (u, v) within a texture image, and is chosen to be color information for this apex. For each pixel within the filled area, sampling is performed from the image. For this operation step, an approach widely known as UV mapping is used. Also, a variety of known approaches can be used when using an approach which finds a normal vector for a triangle during this operation, and controls the brightness in accordance with the eye point position and an angle from a light source position. Also, when a triangle has previously been rendered in front of a triangle intended for rendering in this event, the intended triangle is not rendered. A widely known approach such as a Z buffer method is used for this determination.

The CPU 501 determines whether or not the loop should be terminated for the parameter e of the eye point position (step 1307). When the variable e is equal to or less than a variable eMax, a list of projection matrixes indicative of eye point positions includes those which have not been rendered, so that the value of e is incremented by one, the flow returns to step 1306, a next eye point position is selected, and a triangle is rendered. When the variable e is more than eMax, the flow proceeds to step 1308 because the processing has terminated for all eye point positions.

The CPU 501 determines whether or not the loop should be terminated for the parameter p of triangle selection (step 1308). When the variable p is equal to or less than a variable pMAX, there is a triangle which has not been rendered. The value of the variable p is incremented by one, the flow returns to step 1302, a next triangle is selected, and the processing at steps 1302-1307 is executed to render the triangle. When the variable p is more than the variable pMax, the flow proceeds to step 1309 on the assumption that all triangles have been rendered.

The CPU 501 checks at step 1309 whether or not the entire tree structure has been traced after all triangles have been rendered for the selected model M_i. If there is a model which has not completed the rendering, the flow returns to step 1301, where a next eye point position is selected to render a model.

As the foregoing steps 1301-1309 have terminated, an image is stored in a frame indicative of an image from each eye point position. At this time, the processing at step 1104 terminates.

The CPU 501 integrates images 513 of frames at respective eye point positions using the approach of the previously registered routine 514 (step 1105). In regard to this processing, the contents depend on an approach for displaying a stereoscopic picture, and an existing approach is used.

The CPU 501 transmits the video information integrated at step 1105 to the image output device 505 to present a stereoscopic picture (step 1106).

With the foregoing operations, one frame of picture is presented. The CPU 501 waits until a predetermined time has elapsed, and returns to step 1102 to again render the next frame at the time an interrupt is generated from a timer built in the CPU (step 1107).

The foregoing embodiment can restrain the occurrence of excessive parallax on a stereoscopically displayed picture without changing a rendering impression when viewed from the central eye point position.

Second Embodiment

A second embodiment will be described with reference to FIG. 14. In this embodiment, a picture is generated for a presented object 1400, in accordance with a weighting value applied thereto, with a perspective sense emphasized in the depth direction. This emphasize maintains constant parallax for user's eyes by using a projection conversion. For example, when the original virtual cameras and the object is placed at 1402, 1403 and 1400, this method changed a projection matrix (which is equivalent to transposing these virtual cameras at their interior division position (1404, 1405)). With this conversion, it is possible to display a model which protrudes from the display plane among displayed models, with a largely emphasized model rendering size, without changing the amount of parallax on the screen plane 1401.

Figure 3:
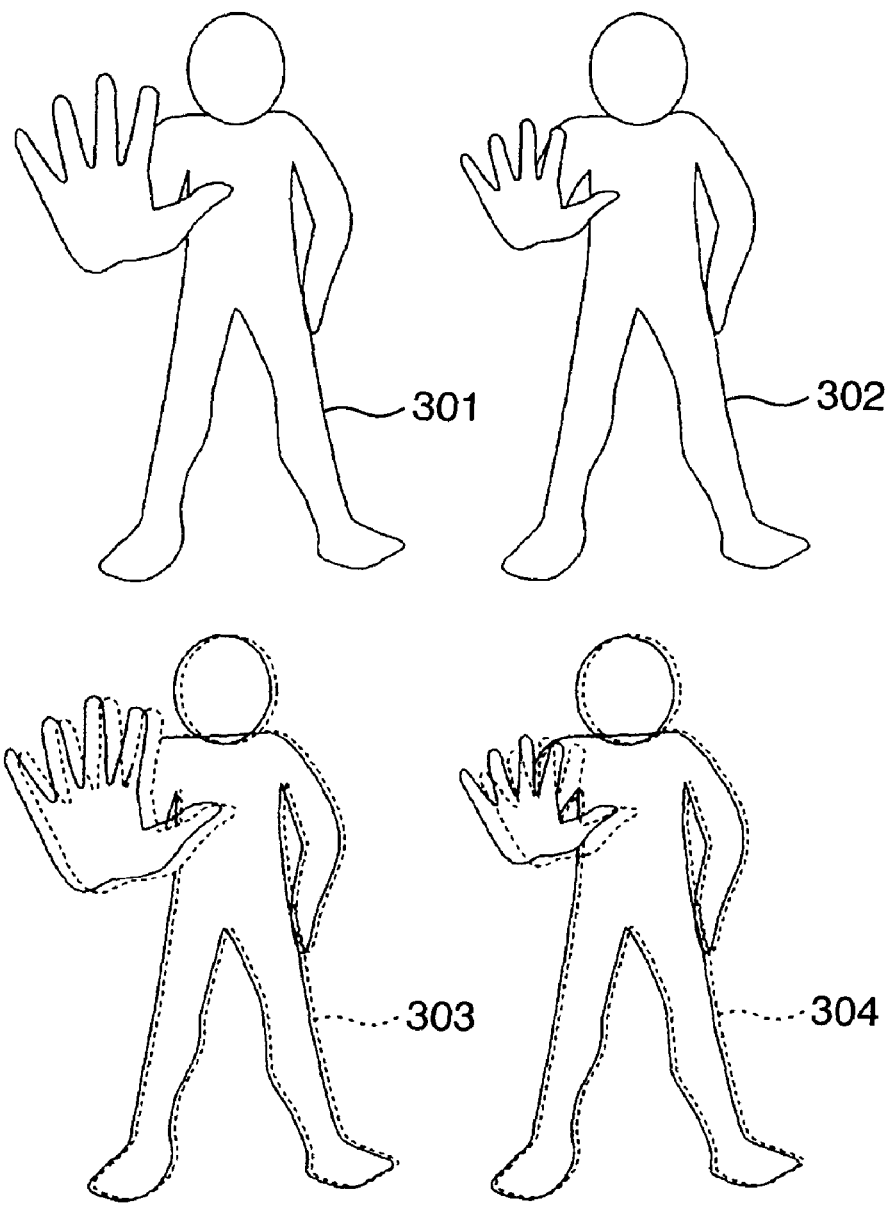
FIG. 3 is a diagram illustrating a displayed image showing effects produced applying the second embodiment.

FIG. 3 is a diagram of an image with parallax added thereto such that a human's hand appears to stretch out. An upper left FIG. 301 and an upper right FIG. 302 both show a person who is stationary with a hand stretched in front, where the upper left FIG. 301 is rendered with a portion stretched in front appearing larger by emphasizing the perspective representation. A lower left FIG. 303 and a lower right FIG. 304 each show the same human when the same amount of parallax is assigned to respective parts. A display resulting from the use of this embodiment is as shown in the figure of fingers in the FIG. 303. In this way, even if the amount of parallax of a picture is the same on the screen plane, matching becomes relatively easier and more natural for human's eye, when these object which has a larger size on display area.

Since an implementation scheme of this embodiment is similar to the first embodiment, a description will be given only of portions different from the first embodiment.

FIG. 15 shows a data structure for preserving positional information on a j-th model, and corresponds to FIG. 9 in the first embodiment. This data structure differs from that of the first embodiment in that the structure provides areas for preserving a number of projection matrixes P_ej and three-dimensional vectors p_ej as much as the quantity eMax of the multocular eye point positions (V), where P_ej represents a projection matrix of a multocular eye point e when a model j is rendered, and p_ej represents a three-dimensional vector indicative of the position of the multocular eye point e when the model j is rendered.

Figure 16:
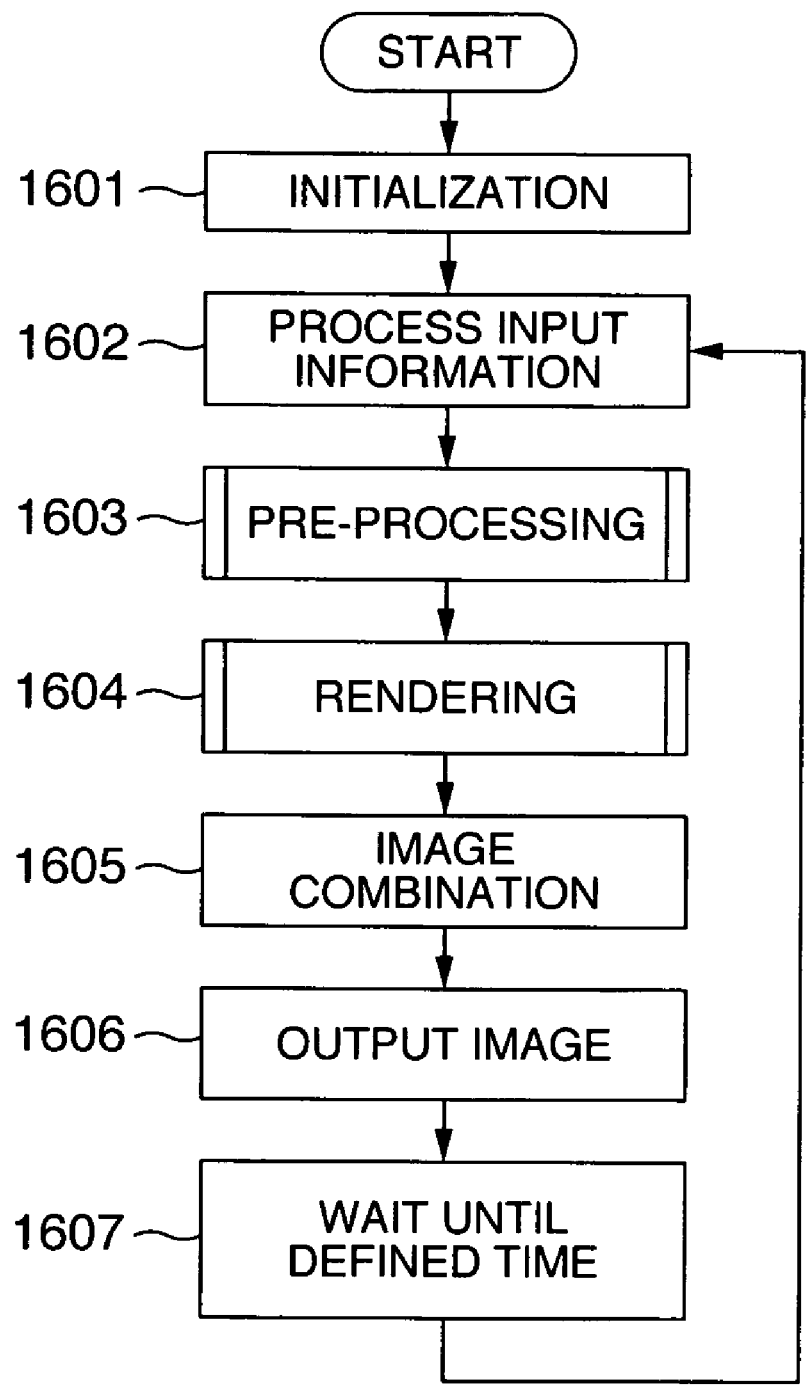
FIG. 16 is a flow diagram illustrating a sequence of operations in the second embodiment.

FIG. 16 is a flow diagram illustrating a sequence of operations in this embodiment. Since operations at 1601-1602, 1605-1607 are substantially the same as the operations at 1101-1102, 1105-1107, a description thereon is omitted.

Figure 17:
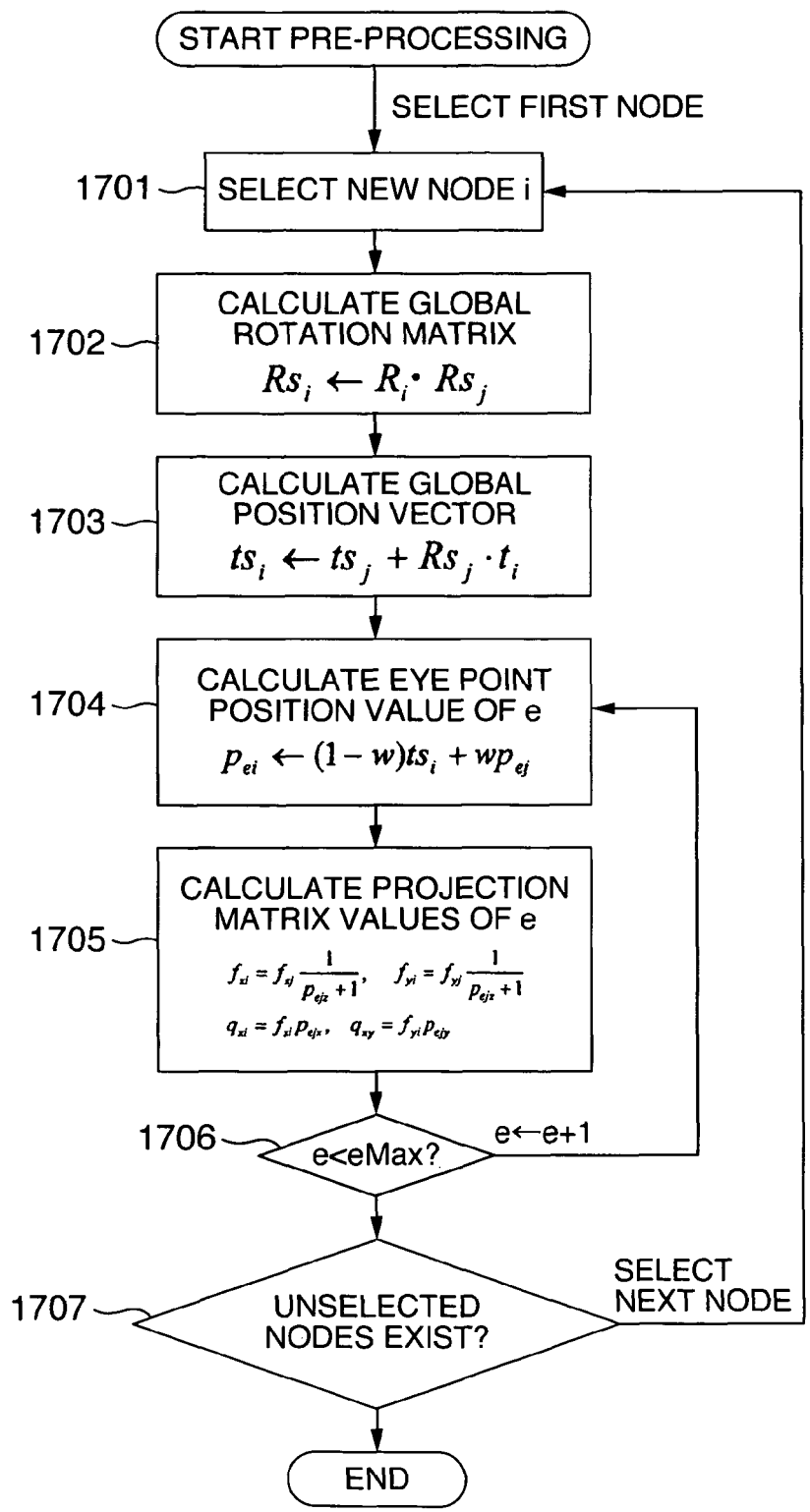
FIG. 17 is a flow diagram illustrating rendering pre-processing steps in the second embodiment.

FIG. 17 is a flow diagram illustrating the contents of a pre-processing step corresponding to step 1603.

The CPU 501 calculates the position of each apex on a current scene coordinate system (step 1603). The CPU 501 recursively traces a tree structure of a scene in order from a reference address of a root node to select an unselected node (step 1701). The CPU 501 performs the processing at steps 1702-1706 for the selected node. In the following, the number of this node is indicated by i, and the number of a parent of this node by j.

The CPU 501 calculates the position of a model i indicated by the selected node on the scene coordinate system (step 1703). The CPU 501 calculates the value of a product Rs_j·R_i of a global rotation matrix Rs_j on the parent's coordinate system and the rotation matrix R_i of the model, and preserves the calculated value in the memory area 903 as a global rotation matrix Rs_i of this model coordinate system.

The CPU 501 finds a global origin central position Ts_j of the model i (step 1704). This step comprises common processing to step 1204.

The CPU 501 varies the variable e from 0 to eMax, and creates parameters for an e-th eye point position (steps 1704-1706). Zero is set as an initial value for the variable e.

The CPU 501 calculates an eye point position p_ei of the virtual camera, as expressed by Equation 16, when the model i is rendered using the virtual camera position p_ej of the parent model, a global motion vector ts_i of this model, and the weighting value w_i (step 1704). The resulting value p_ei is preserved in an e-th element of the data 905 in the structure 900 as a virtual camera position corresponding to the eye point position e of this model.

$$p_{ei} \leftarrow (1-w)ts_i + wp_{ej}$$ [Equation 16]

The CPU 501 calculates a projection matrix P_ei at this time (step 1705). When the parent node j is preserved as expressed by Equation 17, the projection matrix P_ei is calculated in accordance with Equation 18 using these values f_xj, f_yj, q_xj, q_yj, and the calculation result is preserved in 1508 as an e-th element of the eye point data in the model i.

$$P_{ej} = \begin{bmatrix} f_{xj} & 0 & q_{xj} \\ 0 & f_{yj} & q_{yj} \\ 0 & 0 & 1 \end{bmatrix}$$ [Equation 17]

$$f_{xi} = f_{xj}\frac{1}{p_{ejz}+1}, \quad f_{yi} = f_{yj}\frac{1}{p_{ejz}+1}$$ [Equation 18]

$$q_{xi} = f_{xi}p_{ejx}, \quad q_{xy} = f_{yi}p_{ejy}$$

$$P_{ei} = \begin{bmatrix} f_{xi} & 0 & q_{xi} \\ 0 & f_{yi} & q_{yi} \\ 0 & 0 & 1 \end{bmatrix}$$

The CPU 501 determines whether or not the loop should be terminated in regard to the eye position (step 1706). When e is equal to or less than eMax, e is incremented by one, and steps 1704-1706 are repeated. When e has reached eMax, the flow proceeds to step 1707.

The CPU 501 determines whether or not the loop should be terminated in regard to the circulation of the tree structure (step 1707). When there is an unselected node in the three structure of the scene, the flow returns to step 1201 to select a node, and the steps 1702-1706 are performed again for the node. When the processing at steps 1702-1706 has been completed for all nodes, the pre-processing 1603 terminates, followed by a transition to step 1604.

FIG. 18 is a flow diagram illustrating steps for performing rendering processing. A difference in operation between the first embodiment and the second embodiment appears in calculation processing at step 1805. For calculating a two-dimensional image position at an eye point e for global position coordinate values vs_k of apex data of a model M_i, a calculation is performed as expressed by Equation 19 using the projection matrix P_ei preserved in the model M_i, and the value is used in subsequent calculations as u_k.

$$\begin{bmatrix} ax \\ ay \\ az \end{bmatrix} \leftarrow P_{ei} \cdot (vs_j - p_{ei})u_k \leftarrow \begin{bmatrix} \frac{ax}{az+1} \\ \frac{ay}{az+1} \end{bmatrix}$$ [Equation 19]

The remaining processing conforms to the method of the first embodiment.

The foregoing embodiment can emphasize a perspective sense for a stereoscopically displayed picture to readily take matching of recognition between pictures involving parallax, without changing a rendering impression when viewed from the central eye point position.

Third Embodiment

Next, a third embodiment will be described. In the first embodiment, Equation 9 in the processing at step 1305 is changed to Equation 20, and Equation 13 at step 1305 is changed to Equation 21, thereby making it possible to convert an element which is linear in a model such that it maintains the linearity.

$$w_i \leftarrow w0_i$$ [Equation 20]

$$ks_k \leftarrow k_i + w_i/(Rs_i \cdot v_k).z$$ [Equation 21]

where (Rs_i·v_k).z represents the result of a manipulation for calculating the product of a matrix Rs_i and a three-dimensional vector v_k and extracting-its z-component.

The remaining processing conforms to the method of the first embodiment.

The foregoing embodiment can restrain the occurrence of excessive parallax on a stereoscopically displayed picture, while maintaining the linearity for a model which includes many linear components, without changing a rendering impression when viewed from the central eye point position.

Fourth Embodiment

Next, a fourth embodiment will be described. This embodiment can generate a stereoscopic picture associated with non-linear parallax for the depth direction in accordance with a weight of each part of an object having a joint portion and animation information.

FIG. 19 shows an example of apex data of a three-dimensional model used in this embodiment. This data differs from the structure 804 shown in the first embodiment in that two sets of a number sn_k and a weighting value sw_k are provided in each apex data for referencing a node in a tree structure. These are a node number and a weighting value indicating from which node each apex of the model receives transformation information, where the node number is an integer value corresponding to a serial number assigned to each element of the tree structure, and the weighting value sw_k is a floating point value, the total of which is one. An approach for creating such weighting data conforms to widely known computer graphic technique called skin, skin mesh or the like.

FIG. 20 shows an example of a node in a tree structure which constitutes a scene using these models. This is data corresponding to FIG. 9 in the first embodiment. Each node of the tree structure which constitutes a scene is not provided with that corresponding to a reference address, but is instead assigned a node number. This structure is placed on a matrix, such that data can be referenced by this node number. Also, a one-bit flag c_k exists in the structure. When this flag is true, a conversion is made at this node in accordance with the method of Equation 13 in the first embodiment, whereas when this flag is false, a conversion is made at this node using the method of Equation 21 in the third embodiment.

FIG. 21 is a flow diagram illustrating a sequence of operations in this embodiment. Since operations at 2101-2103, 2105-2107 are substantially the same as the operations at 1101-1103, 1105-1107 in the first embodiment, a description thereon is omitted.

Figure 22:
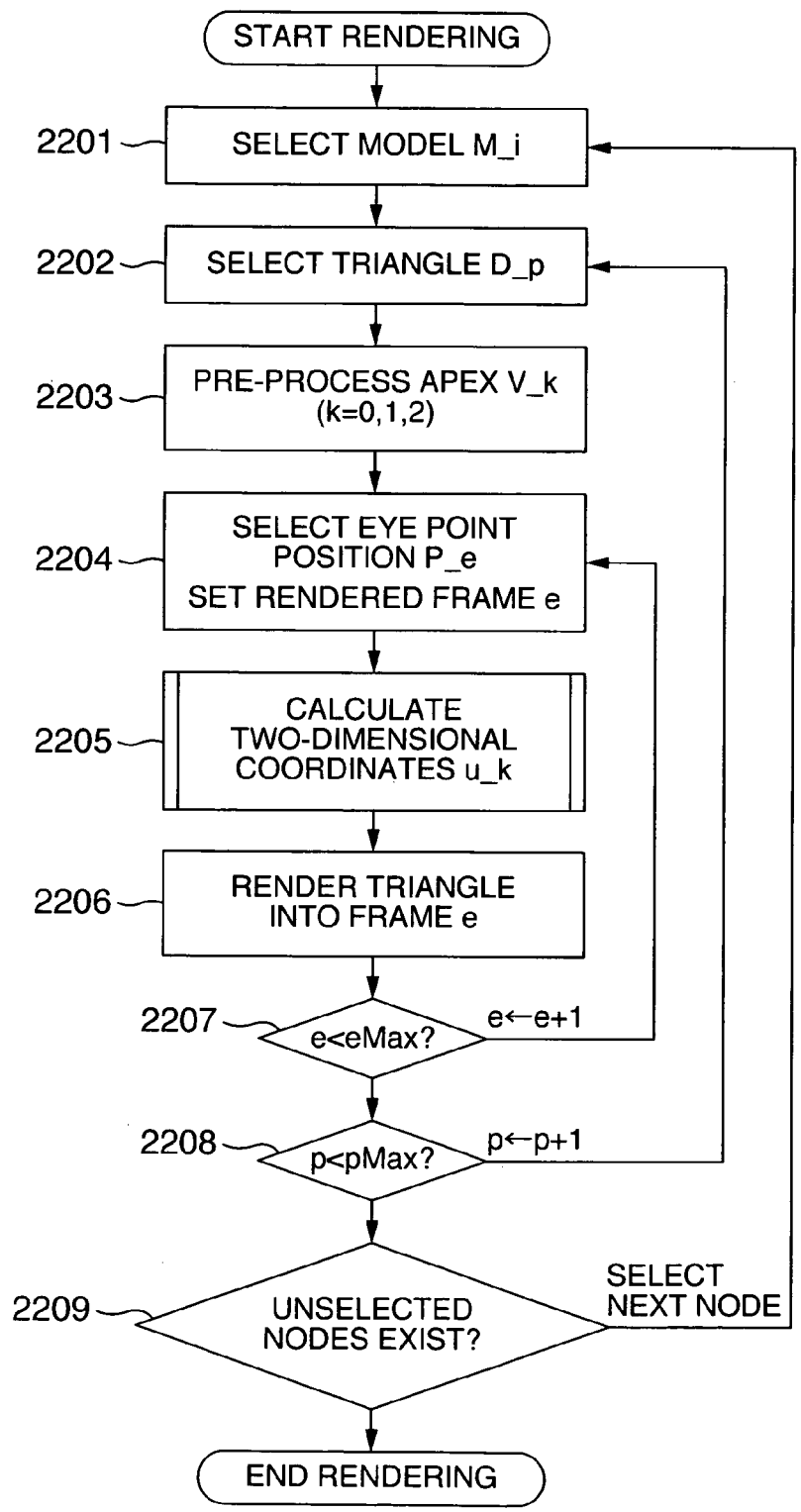
FIG. 22 is a flow diagram illustrating rendering pre-processing steps in the third embodiment.
Figure 23:
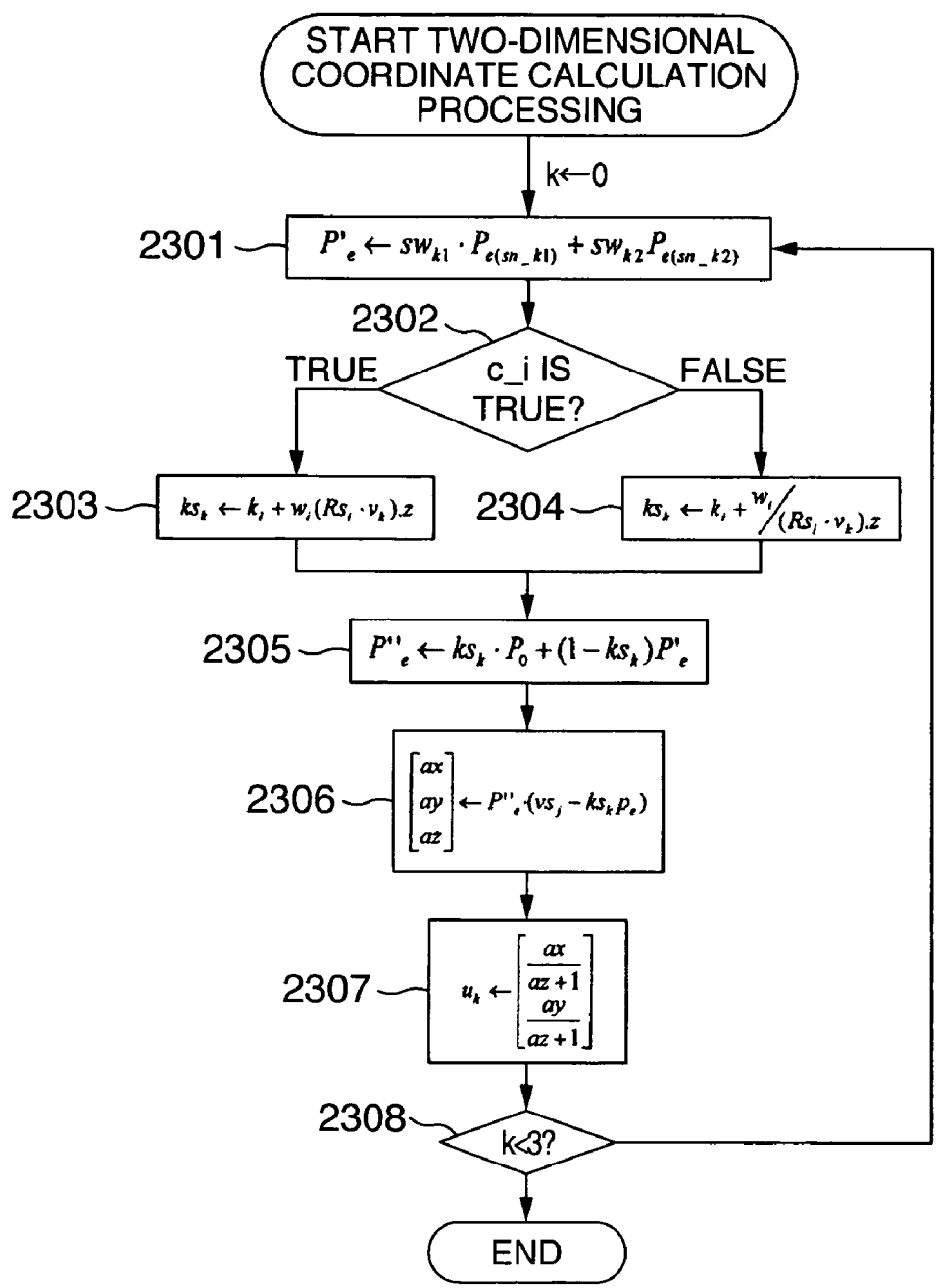
FIG. 23 is a flow diagram illustrating protective transformation processing steps in the third embodiment.

FIG. 22 is a flow diagram illustrating the contents of processing at a rendering step corresponding to step 2104. A difference between this processing and the first embodiment appears at steps 2201 and 2205. The CPU 501, instead of tracing models in order from a scene tree, selects matrixes of the model structure from the first one in order (step 2201). FIG. 23 illustrates the contents of processing in two-dimensional coordinate calculation processing at step 2205.

The CPU 501 performs processing corresponding to step 1305 in the first embodiment at steps 2301-2308. At step 2301, the CPU 501 reads node reference numbers sn_k1, sn_k2 described in a k-th apex data, and weighting values sw_k1, sw_k2, and calculates Equation 22.

$$P'_e \leftarrow sw_{k1} \cdot P_{e(sn\_k1)} + sw_{k2} P_{e(sn\_k2)} \qquad \text{[Equation 22]}$$

The CPU 501 determines at step 2302 whether or not a flag c_i of a model i is true. When the flag c_i is true, the CPU 501 calculates Equation 13 at step 2302 for calculating a projection matrix P_ej using the approach of the first embodiment. When a flag c_k of a node is false, the CPU 501 calculates Equation 21 at step 2304 for calculating the projection matrix P_ej using the approach of the third embodiment.

The CPU 501 calculates Equation 23 to find P″e using the resulting value of ks_k and using the value of this P'e.

$$P''_e \leftarrow ks_k \cdot P_0 + (1 - ks_k) P'_e \qquad \text{[Equation 23]}$$

The CPU 501 calculates Equation 24 using the value of P″e to create a two-dimensional apex vector u_k from the value of a three-dimensional apex vector v_k:

$$\begin{bmatrix} ax \\ ay \\ az \end{bmatrix} \leftarrow P'_e \cdot (vs_j - ks_k p_e) u_k \leftarrow \begin{bmatrix} \frac{ax}{az+1} \\ \frac{ay}{az+1} \end{bmatrix} \qquad \text{[Equation 24]}$$

By repeatedly performing the foregoing processing for k=0, 1, 2, the CPU 501 terminates the processing step 2205 for converting a triangle of a three-dimensional vector to a vector of a two-dimensional image.

The processing other than this processing conforms to the first embodiment.

The foregoing embodiment can restrain the occurrence of excessive parallax on a stereoscopically displayed picture, while mixing the effects of the first embodiment and third embodiment and maintaining an impression of smooth parameter switching for the joint portion of the model, without changing a rendering impression when viewed from the central eye point position.

Fifth Embodiment

While each method in the foregoing embodiments has described means for interactively creating a picture, the present invention is not limited to interactive utilization. The present invention can be used for methods of preserving these output results to reproduce an animation, creating a printed matter using the results as a single picture, and the like.

According to the present invention, emphasis and parallax, which cannot be controlled with an ordinary projection matrix, are controlled for each part of a stereoscopic image.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A stereoscopic picture generating apparatus comprising:
   a storage device for storing information indicative of positions of a plurality of predetermined eye positions; and
   a processing unit for creating a stereoscopic picture of a three-dimensional model based on the information, wherein said processing unit creates two-dimensional images that are rendered as images of the three-dimensional model from converted eye positions, wherein the two dimensional images are created by applying conversion, the conversion is applied by calculating a two-dimensional image position at an eye point e for global position coordinate values vs_k of apex data of a model M i, a calculation is performed using the projection matrix P ei preserved in the model M i, $$\begin{bmatrix} ax \\ ay \\ az \end{bmatrix} \leftarrow P_{ei} \cdot (vs_j - p_{ei})$$

$$u_k \leftarrow \begin{bmatrix} \frac{ax}{az+1} \\ \frac{ay}{az+1} \end{bmatrix}$$

wherein, $$f_{xi} = f_{xj} \frac{1}{p_{ejz}+1}, \; f_{yi} = f_{yj} \frac{1}{p_{ejz}+1}$$

$$q_{xi} = f_{xi} p_{ejx}, \; q_{xy} = f_{yi} p_{ejy}$$

$$P_{ei} = \begin{bmatrix} f_{xi} & 0 & q_{xi} \\ 0 & f_{yi} & q_{yi} \\ 0 & 0 & 1 \end{bmatrix},$$

f_x, f_y represent vertical and horizontal values in three-dimensional plane; p_ex, p_ey, p_ez represent eye point position represented in three dimensional vector; ax, ay, az are positions in three-dimensional coordinate wherein of different parameters are used for different ones of the predetermined eye positions during the conversion, wherein each of the parameters is set to make a distance between the converted eye positions shorter than a distance between the predetermined eye positions, and to make a distance between a screen on which the two-dimensional images are rendered and the converted eye positions shorter than a distance between the screen and the predetermined eye positions, wherein said processing unit displays each of the two-dimensional images which are switched from one converted eye position to another.

2. A stereoscopic picture generating apparatus according to claim 1, wherein:
   said predetermined calculation includes finding a product of a weight registered in each part of the model and a protrusion amount of a apex from a display plane.

3. A stereoscopic picture generating apparatus according to claim 2, wherein:
said processing unit reduces the amount of parallax between images corresponded to the plurality of predetermined eye positions in accordance with the product.

4. A stereoscopic picture generating apparatus according to claim 2, wherein:
said processing unit makes a rate at which the parallax of each model is reduced proportional to an inverse of a depth distance from the predetermined eye positions.

5. A stereoscopic picture generating apparatus according to claim 4, wherein:
said processing unit selects a projection parameter such that a linear portion of the model maintains the linearity even after the conversion.

6. A stereoscopic picture generating apparatus according to claim 2, wherein:
said processing unit renders a protruding portion of the model while limiting the amount of parallax between images corresponded to the respective predetermined eye positions to a fixed value.

7. A stereoscopic picture generating apparatus according to claim 2, wherein:
said processing unit changes a rendering method based on switching information.

8. A stereoscopic picture generating apparatus comprising: an interface for connecting to an external device; a storage device for storing a program and information; and
a CPU for executing the program,
wherein said information includes information indicative of positions of a plurality of predetermined eye positions, each corresponding to a view from one eye, and said program comprises a routine for creating a two-dimensional images that are rendered as images of the three-dimensional model from converted eye positions, wherein the two-dimensional images are created by applying conversion, wherein different parameters are used for different ones of the predetermined eye positions during the conversion, the two-dimensional images are created by applying conversion of the two-dimensional images positions at an eye point e for global position coordinate values vs k of apex data of a model M i, a calculation is performed using a projection matrix P ei preserved in the model M i, $$\begin{bmatrix} ax \\ ay \\ az \end{bmatrix} \leftarrow P_{ei} \cdot (vs_j - p_{ei})$$

$$u_k \leftarrow \begin{bmatrix} \dfrac{ax}{az+1} \\ \dfrac{ay}{az+1} \end{bmatrix}$$

wherein $$f_{xi} = f_{xj}\dfrac{1}{p_{ejz}+1}, \ f_{yi} = f_{yj}\dfrac{1}{p_{ejz}+1}$$

$$q_{xi} = f_{xi} p_{ejx}, \ q_{xy} = f_{yi} p_{ejy}$$

$$P_{ei} = \begin{bmatrix} f_{xi} & 0 & q_{xi} \\ 0 & f_{yi} & q_{yi} \\ 0 & 0 & 1 \end{bmatrix},$$

f_x, f_y represent vertical and horizontal values in three-dimensional plane; p_ex, p_ey, p_ez represent eye point position represented in three dimensional vector; ax, ay, az are positions in three-dimensional coordinate wherein each of the parameters is set to make a distance between the converted eye positions shorter than a distance between the predetermined eye positions, and to make a distance between a screen on which the two-dimensional images are rendered and the converted eye positions shorter than a distance between the screen and the predetermined eye positions, wherein said program includes a routine for displaying each of the two-dimensional images which are switched from one converted eye position to another.

* * * * *